United States Patent
Zhu et al.

(10) Patent No.: US 12,501,256 B2
(45) Date of Patent: Dec. 16, 2025

(54) METHOD AND DEVICE FOR ALLOCATING AND OBTAINING IP ADDRESS

(71) Applicant: HUAWEI TECHNOLOGIES CO., LTD., Guangdong (CN)

(72) Inventors: Fangyuan Zhu, Beijing (CN); Yan Li, Beijing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 425 days.

(21) Appl. No.: 17/518,580

(22) Filed: Nov. 3, 2021

(65) Prior Publication Data

US 2022/0060884 A1 Feb. 24, 2022

Related U.S. Application Data

(63) Continuation of application No. PCT/CN2020/087233, filed on Apr. 27, 2020.

(30) Foreign Application Priority Data

May 5, 2019 (CN) .......................... 201910367468.7

(51) Int. Cl.
*H04W 8/26* (2009.01)
*H04L 61/5007* (2022.01)
(Continued)

(52) U.S. Cl.
CPC ........... *H04W 8/26* (2013.01); *H04L 61/5007* (2022.05); *H04W 76/10* (2018.02); *H04L 2101/686* (2022.05)

(58) Field of Classification Search
CPC ...... H04W 8/26; H04W 76/10; H04L 61/5007
(Continued)

(56) References Cited

U.S. PATENT DOCUMENTS

2014/0022904 A1* 1/2014 Ahmad ............... H04L 47/2475
370/235
2017/0280491 A1 9/2017 Salkintzis
(Continued)

FOREIGN PATENT DOCUMENTS

CN 106973121 A 7/2017
CN 109121170 A 1/2019
(Continued)

OTHER PUBLICATIONS

ZTE, Modification to the PDU session establishment for virtual TSN Bridge. 3GPP TSG-SA WG2 Meeting #134, Sapporo, Japan Jun. 24-28, 2019 , S2-1907745, 13 pages.
(Continued)

*Primary Examiner* — Joel Ajayi

(57) ABSTRACT

This application provides a method for allocating an IP address, including: establishing, by a session management network element, a session for a terminal apparatus, where the session is used for transmitting a data packet via a control plane network element; allocating, by the session management network element, an IP address to the terminal apparatus; and sending, by the session management network element, the data packet to the terminal apparatus via a mobility management network element, where the data packet includes the IP address. In a case in which the terminal apparatus can obtain the IP address without establishing an additional connection channel, the terminal apparatus can obtain the IP address more flexibly, and occupation of excessive signaling resources can be avoided.

12 Claims, 14 Drawing Sheets

(51) Int. Cl.
*H04W 76/10* (2018.01)
*H04L 101/686* (2022.01)

(58) Field of Classification Search
USPC .......................................................... 455/445
See application file for complete search history.

(56) References Cited

U.S. PATENT DOCUMENTS

2018/0270741 A1* 9/2018 Enomoto .............. H04W 48/17
2018/0324140 A1 11/2018 Cao et al.

FOREIGN PATENT DOCUMENTS

| CN | 109314893 | A | 2/2019 |
| CN | 109392042 | A | 2/2019 |
| CN | 109429363 | A | 3/2019 |
| CN | 109691059 | A | 4/2019 |

OTHER PUBLICATIONS

3GPP TS 23.501 V16.0.2 (Apr. 2019), 3rd Generation Partnership Project; Technical Specification Group Services and System Aspects; System Architecture for the 5G System; Stage 2(Release 16), 316 pages.

3GPP TS 23.060 V16.0.0 (Mar. 2019), 3rd Generation Partnership Project; Technical Specification Group Services and System Aspects; General Packet Radio Service (GPRS); Service description; Stage 2(Release 16), 367 pages.

Huawei, HiSilicon, Clarification of the PDU Session Release Procedure. 3GPP TSG-SA WG2 Meeting #134, Sapporo, Japan, Jun. 24-Jun. 28, 2019, S2-1907325, 3 pages.

3GPP TS 23.502 V16.0.2 (Apr. 2019), 3rd Generation Partnership Project; Technical Specification Group Services and System Aspects; Procedures for the 5G System; Stage 2(Release 16), 419 pages.

3GPP TS 23.401 V16.2.0 (Mar. 2019), 3rd Generation Partnership Project; Technical Specification Group Services and System Aspects; General Packet Radio Service (GPRS) enhancements for Evolved Universal Terrestrial Radio Access Network (E-UTRAN) access(Release 16), 418 paes.

3GPP TS 23.402 V15.3.0 (Mar. 2018), 3rd Generation Partnership Project; Technical Specification Group Services and System Aspects; Architecture enhancements for non-3GPP accesses(Release 15), 314 pages.

Huawei et al: Introduction of small datatransfer in Control Plane CIoT 5GS Optmisation, 3GPP Draft: 82-1901310,Jan. 25, 2019,XP051597209, total 22 pages.

Ericsson:"Evaluation of solution #12 onIP address allocation" 3GPP Draft;S2-187995, Aug. 14, 2018, XP051536946, total 3 pages.

3GPP TR 23.724 V16.0.0 3rd Generation Partnership Project; Technical Specification Group Services and System Aspects; Study on Cellular Internet of Things (IoT) support and evolution for the 5G System (Release 16) Dec. 2018 total 276 pages.

3GPP TS 23.501 V15.5.0 (Mar. 2019), 3rd Generation Partnership Project; Technical Specification Group Services and System Aspects; System Architecture for the 5G System; Stage 2(Release 15), 240 pages.

* cited by examiner

METHOD AND DEVICE FOR ALLOCATING AND OBTAINING IP ADDRESS

CROSS-REFERENCE TO RELATED APPLICATIONS

This application is a continuation of International Patent Application No. PCT/CN2020/087233, filed on Apr. 27, 2020, which claims priority to Chinese Patent Application No. 201910367468.7, filed on May 5, 2019. The disclosures of the aforementioned applications are hereby incorporated by reference in their entireties.

TECHNICAL FIELD

This application relates to the communications field, and more specifically, to a method and device for allocating and obtaining an IP address.

BACKGROUND

A terminal apparatus may obtain an internet protocol (IP) address of the terminal apparatus from a core network device through a user plane connection. For example, in an evolved packet core (EPC) network architecture, key logical network elements include a mobility management entity (MME), a serving gateway (S-GW), and a packet data network gateway (P-GW). The terminal apparatus may obtain the IP address of the terminal apparatus through the user plane connection that is between a radio access network (RAN) device, an SGW, and a PGW. For another example, in a 5G communications network architecture, key logical network elements include a network element having an access and mobility management function (AMF), a network element having a session management function (SMF), and a network element having a user plane function (UPF). The terminal apparatus may obtain the IP address of the terminal apparatus via a user plane tunnel between a RAN and a UPF.

In the EPC architecture and the 5G communications network architecture, to support small-size packet data transmission in a cellular internet of things (CIOT) scenario, the terminal apparatus may establish a session that supports control plane data transmission with a control plane network element. The session implements data transfer by established connection channels between network elements. However, in a session establishment procedure, the terminal apparatus cannot obtain the IP address via the user plane connection path. For example, in the EPC network architecture, there is no user plane connection between the RAN and the SGW for the session that supports control plane data transmission. For another example, in the 5G communications network architecture, there is no user plane tunnel between the RAN and the UPF for the session that supports control plane data transmission. Therefore, a new interaction manner needs to be provided, so that the terminal apparatus can still obtain the IP address when the session that supports control plane data transmission is established.

SUMMARY

This application provides a method and device for allocating and obtaining an IP address, so that a terminal apparatus can obtain the IP address more flexibly.

According to a first aspect, a method for allocating an IP address is provided, including: establishing, by a session management network element, a session for a terminal apparatus, where the session is used for transmitting a data packet via a control plane network element; allocating, by the session management network element, an IP address to the terminal apparatus; and sending, by the session management network element, the data packet to the terminal apparatus via the mobility management network element, where the data packet includes the IP address.

In this embodiment of this application, there is no connection channel between some network elements for the session used for transmitting the data via a control plane. According to the method for allocating an IP address provided in this application, the terminal apparatus can obtain the IP address without establishing an additional connection channel, so that the terminal apparatus can obtain the IP address more flexibly, and occupation of excessive signaling resources can be avoided.

With reference to the first aspect, in some implementations of the first aspect, the method further includes: receiving, by the session management network element, a request message sent by the mobility management network element, where the request message includes first indication information; and the allocating, by the session management network element, an IP address to the terminal apparatus includes: allocating, by the session management network element, the IP address to the terminal apparatus based on the first indication information.

In this embodiment of this application, the session management network element may receive the first indication information in a session establishment procedure. Therefore, the session management network element may not receive an IP address request sent by the terminal apparatus, or may allocate the IP address to the terminal apparatus before receiving an IP address request sent by the terminal apparatus. The terminal apparatus may obtain the IP address in advance, so that the IP address can be allocated to the terminal apparatus in a more flexible way, signaling overheads can be reduced, and the terminal apparatus can obtain the IP address earlier.

With reference to the first aspect, in some implementations of the first aspect, the first indication information includes control plane data transmission indication information.

In this embodiment of this application, the first indication information may be control plane cellular internet of things 5G system optimization (Control Plane CIoT 5GS Optimization) indication information. That is, the session management network element is indicated, by using the Control Plane CIoT 5GS Optimization indication information, to allocate the IP address to the terminal apparatus.

Optionally, the first indication information may be further used to indicate the session management network element to send the IP address to the mobility management network element, or the first indication information is used to indicate the session management network element not to send the IP address to a data forwarding network element; or second indication information is used to indicate the session management network element not to select a data forwarding network element, or the second indication information is used to indicate the session management network element to select a data forwarding network element after allocating the IP address.

With reference to the first aspect, in some implementations of the first aspect, the method further includes: selecting, by the session management network element based on the first indication information, a data forwarding network element after the session is established and before the session management network element sends the data packet to the terminal apparatus via the mobility management network element.

In this embodiment of this application, a packet check function may be enabled for the session management network element, so that the session management network element does not need to request another network element to unpack the data packet. On the one hand, an amount of transmitted data is reduced; on the other hand, time for the process of obtaining the IP address by the terminal apparatus may be shortened, a quantity of forwarding times of signaling may be reduced, and the IP address may be obtained more flexibly.

With reference to the first aspect, in some implementations of the first aspect, before the allocating, by the session management network element, an IP address to the terminal apparatus, the method further includes: receiving, by the session management network element, second indication information that is sent by the mobility management network element and that is from the terminal apparatus, where the second indication information is used to indicate the session management network element to allocate the IP address to the terminal apparatus.

Optionally, before the allocating, by the session management network element, an IP address to the terminal apparatus, the method further includes: receiving, by the session management network element, third indication information sent by the data forwarding network element, where the third indication information is used to indicate the session management network element to allocate the IP address.

In this embodiment of this application, the session management network element may learn, based on the indication information sent by the terminal apparatus, that content of the uplink data packet is used to request the IP address, and the uplink data packet may not be unpacked by another network element (for example, the uplink data packet is forwarded to the data forwarding network element and unpacked by the data forwarding network element). In this way, signaling overheads are reduced.

With reference to the first aspect, in some implementations of the first aspect, the method further includes: receiving, by the session management network element, an uplink data packet that is sent by the mobility management network element and that is from the terminal apparatus, where the uplink data packet includes a router solicitation (RS) packet or a dynamic host configuration protocol (DHCP) discovery packet; and allocating, by the session management network element, the IP address to the terminal apparatus based on the uplink data packet.

In this embodiment of this application, the session management network element may be triggered to obtain the IP address based on content of the data packet. That is, after receiving the data packet whose type is an RS packet or a DHCP discovery packet, the session management network element may be triggered to allocate the IP address to the terminal apparatus. Therefore, another network element or device may not be required to send an indication to the session management network element.

With reference to the first aspect, in some implementations of the first aspect, a downlink data packet includes a router advertisement (RA) packet or a DHCP offer packet.

Optionally, the IP address is carried in a non-access stratum (NAS) packet carrying session establishment permission information.

In this embodiment of this application, the session management network element may carry, in response to the uplink data packet, the IP address in a downlink data packet corresponding to the uplink data packet. The session management network element may not use a new packet type to send the IP address. Therefore, this embodiment may be more compatible with an existing communications system.

With reference to the first aspect, in some implementations of the first aspect, the mobility management network element is a network element having an access and mobility management function (AMF), and the session management network element is a network element having a session management function (SMF); or the mobility management network element is a mobility management entity (MME), and the session management network element is a packet data network gateway (PGW).

The method for allocating an IP address provided in this embodiment of this application may be used in a plurality of communications systems.

With reference to the first aspect, in some implementations of the first aspect, a session type is one of internet protocol version 6 (IPv6), hybrid internet protocol version 4 and version 6 (IPv4v6), and internet protocol version 4 (IPv4).

According to a second aspect, a method for obtaining an internet protocol IP address is provided, including: sending, by a terminal apparatus, a session establishment request message to a mobility management network element, where the session establishment request message is used to request to establish a session that is between the terminal apparatus and a session management network element and that is used for transmitting a data packet via a control plane network element, and the data packet includes an uplink data packet and a downlink data packet; sending, by the terminal apparatus, the uplink data packet to the mobility management network element, where the uplink data packet includes target indication information, and the target indication information is used to indicate the session management network element to allocate an IP address; and receiving, by the terminal apparatus via the mobility management network element, the downlink data packet sent by the session management network element, where the downlink data packet includes the IP address.

Optionally, the target indication information is used to indicate the session management network element to send the IP address to the mobility management network element, or the first indication information is used to indicate the session management network element not to send the IP address to a data forwarding network element; or the second indication information is used to indicate the session management network element not to select a data forwarding network element, or the second indication information is used to indicate the session management network element to select a data forwarding network element after allocating the IP address.

With reference to the second aspect, in some implementations of the second aspect, the downlink data packet includes an RA packet or a DHCP offer packet.

With reference to the second aspect, in some implementations of the second aspect, the mobility management network element is a network element having an AMF, and the session management network element is a network element having an SMF; or the mobility management network element is an MME, and the session management network element is a PGW.

With reference to the second aspect, in some implementations of the second aspect, a session type is one of IPv6, IPv4v6, and IPv4.

According to a third aspect, a device for allocating an IP address is provided, including: a processing module, configured to establish a session for a terminal apparatus, where the session is used for transmitting a data packet via a control plane network element, where the processing module is further configured to allocate an IP address to the terminal apparatus; and a sending module, configured to send the data packet to the terminal apparatus via a mobility management network element, where the data packet includes the IP address.

With reference to the third aspect, in some implementations of the third aspect, the device further includes a receiving module, configured to receive a request message sent by the mobility management network element, where the request message includes first indication information; and the processing module is configured to allocate the IP address to the terminal apparatus based on the first indication information.

With reference to the third aspect, in some implementations of the third aspect, the first indication information includes control plane data transmission indication information.

With reference to the third aspect, in some implementations of the third aspect, the processing module is further configured to select, based on the first indication information, a data forwarding network element after the session is established and before the sending module sends the data packet to the terminal apparatus via the mobility management network element.

With reference to the third aspect, in some implementations of the third aspect, the device further includes the receiving module; and before the processing module allocates the IP address to the terminal apparatus, the receiving module is configured to receive second indication information that is sent by the mobility management network element and that is from the terminal apparatus, where the second indication information is used to indicate the session management network element to allocate the IP address to the terminal apparatus.

With reference to the third aspect, in some implementations of the third aspect, the device further includes the receiving module, and the receiving module is configured to receive an uplink data packet that is sent by the mobility management network element and that is from the terminal apparatus, where the uplink data packet includes a router solicitation RS packet or a dynamic host configuration protocol DHCP discovery packet; and the processing module is further configured to allocate the IP address to the terminal apparatus based on the uplink data packet.

With reference to the third aspect, in some implementations of the third aspect, a downlink data packet includes a router advertisement RA packet or a DHCP offer packet.

With reference to the third aspect, in some implementations of the third aspect, the mobility management network element is a network element having an AMF, and the device is a network element having an SMF; or the mobility management network element is an MME, and the device is a PGW.

With reference to the third aspect, in some implementations of the third aspect, a session type is one of IPv6, IPv4v6, and IPv4.

According to a fourth aspect, a terminal apparatus is provided, including: a sending module, configured to send a session establishment request message to a mobility management network element, where the session establishment request message is used to request to establish a session that is between the terminal apparatus and the session management network element and that is used for transmitting a data packet via a control plane network element, the data packet includes an uplink data packet and a downlink data packet, and the sending module is further configured to send the uplink data packet to the mobility management network element, where the uplink data packet includes target indication information, and the target indication information is used to indicate the session management network element to allocate an IP address; and a receiving module, configured to receive, via the mobility management network element, the downlink data packet sent by the session management network element, where the downlink data packet includes the IP address.

With reference to the fourth aspect, in some implementations of the fourth aspect, the downlink data packet includes an RA packet or a DHCP offer packet.

With reference to the fourth aspect, in some implementations of the fourth aspect, the mobility management network element is a network element having an AMF, and the session management network element is a network element having an SMF; or the mobility management network element is an MME, and the session management network element is a PGW.

With reference to the fourth aspect, in some implementations of the fourth aspect, a session type is one of IPv6, IPv4v6, and IPv4.

According to a fifth aspect, an apparatus for allocating an IP address is provided, including modules or units configured to perform the method according to any one of the implementations of the first aspect.

According to a sixth aspect, an apparatus for obtaining an IP address is provided, including modules or units configured to perform the method according to any one of the implementations of the second aspect.

According to a seventh aspect, a device for allocating an IP address is provided, including a processor. The processor is coupled to a memory, and may be configured to execute an instruction in the memory, to implement the method according to any one of the implementations of the first aspect. Optionally, the device for allocating an IP address further includes the memory. Optionally, the device for allocating an IP address further includes a communications interface, and the processor is coupled to the communications interface.

In an implementation, the device for allocating an IP address is a communications device, for example, the session management network element in the embodiments of this application. When the device for allocating an IP address is the communications device, the communications interface may be a transceiver or an input/output interface.

In another implementation, the device for allocating an IP address is a chip configured in a communications device, for example, a chip configured in the session management network element in the embodiments of this application. When the device for allocating an IP address is the chip configured in the communications device, the communications interface may be an input/output interface.

Optionally, the transceiver may be a transceiver circuit. Optionally, the input/output interface may be an input/output circuit.

According to an eighth aspect, a device for obtaining an IP address is provided, including a processor. The processor is coupled to a memory, and may be configured to execute an instruction in the memory, to implement the method according to any one of the implementations of the second aspect. Optionally, the device for obtaining an IP address further includes the memory. Optionally, the device for obtaining an IP address further includes a communications interface, and the processor is coupled to the communications interface.

In an implementation, the device for obtaining an IP address is a communications device, for example, the terminal apparatus in the embodiments of this application. When the device for obtaining an IP address is the communications device, the communications interface may be a transceiver or an input/output interface.

In another implementation, the device for obtaining an IP address is a chip configured in a communications device, for example, a chip configured in the terminal apparatus in the embodiments of this application. When the device for obtaining an IP address is the chip configured in the communications device, the communications interface may be an input/output interface.

Optionally, the transceiver may be a transceiver circuit. Optionally, the input/output interface may be an input/output circuit.

According to a ninth aspect, a processor is provided, including an input circuit, an output circuit, and a processing circuit. The processing circuit is configured to: receive a signal via the input circuit, and transmit a signal via the output circuit, so that the processor performs the method according to any one of the implementations of the first aspect.

In an embodiment, the processor may be a chip, the input circuit may be an input pin, the output circuit may be an output pin, and the processing circuit may be a transistor, a gate circuit, a trigger, various logic circuits, or the like. An input signal received by the input circuit may be received and input by, for example, but not limited to, a receiver; a signal output by the output circuit may be output to, for example, but not limited to, a transmitter and transmitted by the transmitter; and the input circuit and the output circuit may be a same circuit, where the circuit is used as the input circuit and the output circuit at different moments. Implementations of the processor and the various circuits are not limited in the embodiments of this application.

According to a tenth aspect, a processor is provided, including an input circuit, an output circuit, and a processing circuit. The processing circuit is configured to: receive a signal via the input circuit, and transmit a signal via the output circuit, so that the processor performs the method according to any one of the implementations of the second aspect.

In an embodiment, the processor may be a chip, the input circuit may be an input pin, the output circuit may be an output pin, and the processing circuit may be a transistor, a gate circuit, a trigger, various logic circuits, or the like. An input signal received by the input circuit may be received and input by, for example, but not limited to, a receiver; a signal output by the output circuit may be output to, for example, but not limited to, a transmitter and transmitted by the transmitter; and the input circuit and the output circuit may be a same circuit, where the circuit is used as the input circuit and the output circuit at different moments. Implementations of the processor and the various circuits are not limited in the embodiments of this application.

According to an eleventh aspect, a processing apparatus is provided, including a processor and a memory. The processor is configured to: read an instruction stored in the memory, receive a signal via a receiver, and transmit a signal via a transmitter, to perform the method according to any one of the implementations of the first aspect.

Optionally, there are one or more processors and one or more memories.

Optionally, the memory may be integrated with the processor, or the memory and the processor are separately disposed.

In an embodiment, the memory may be a non-transitory memory, for example, a read-only memory (ROM). The memory and the processor may be integrated on a same chip, or may be separately disposed on different chips. A type of the memory and a manner for disposing the memory and the processor are not limited in the embodiments of this application.

It should be understood that a related data exchange process, for example, sending of indication information, may be a process of outputting indication information from the processor, and receiving of capability information, may be a process of receiving input capability information by the processor. Data output by the processor may be output to the transmitter, and input data received by the processor may be from the receiver. The transmitter and the receiver may be collectively referred to as a transceiver.

The processing apparatus according to the eleventh aspect may be a chip. The processor may be implemented by using hardware or software. When the processor is implemented by using hardware, the processor may be a logic circuit, an integrated circuit, or the like; or when the processor is implemented by using software, the processor may be a general-purpose processor, and is implemented by reading software code stored in the memory. The memory may be integrated into the processor, or may exist independently outside the processor.

According to a twelfth aspect, a processing apparatus is provided, including a processor and a memory. The processor is configured to: read an instruction stored in the memory, receive a signal via a receiver, and transmit a signal via a transmitter, to perform the method according to any one of the implementations of the second aspect.

Optionally, there are one or more processors and one or more memories.

Optionally, the memory may be integrated with the processor, or the memory and the processor are separately disposed.

In an embodiment, the memory may be a non-transitory memory, for example, a read-only memory (ROM). The memory and the processor may be integrated on a same chip, or may be separately disposed on different chips. A type of the memory and a manner for disposing the memory and the processor are not limited in the embodiments of this application.

It should be understood that a related data exchange process, for example, sending of indication information, may be a process of outputting indication information from the processor, and receiving of capability information, may be a process of receiving input capability information by the processor. Data output by the processor may be output to the transmitter, and input data received by the processor may be from the receiver. The transmitter and the receiver may be collectively referred to as a transceiver.

The processing apparatus according to the twelfth aspect may be a chip. The processor may be implemented by using hardware or software. When the processor is implemented by using hardware, the processor may be a logic circuit, an integrated circuit, or the like; or when the processor is implemented by using software, the processor may be a general-purpose processor, and is implemented by reading software code stored in the memory. The memory may be integrated into the processor, or may exist independently outside the processor.

According to a thirteenth aspect, a computer program product is provided. The computer program product includes a computer program (which may also be referred to as code or an instruction). When the computer program is run, a computer is enabled to perform the method according to any one of the implementations of the first aspect.

According to a fourteenth aspect, a computer program product is provided. The computer program product includes a computer program (which may also be referred to as code or an instruction). When the computer program is run, a computer is enabled to perform the method according to any one of the implementations of the second aspect.

According to a fifteenth aspect, a computer-readable medium is provided. The computer-readable medium stores a computer program (which may also be referred to as code or an instruction). When the computer program is run on a computer, the computer is enabled to perform the method according to any one of the implementations of the first aspect.

According to a sixteenth aspect, a computer-readable medium is provided. The computer-readable medium stores a computer program (which may also be referred to as code or an instruction). When the computer program is run on a computer, the computer is enabled to perform the method according to any one of the implementations of the second aspect.

According to a seventeenth aspect, a communications system is provided. The communications system includes the foregoing mobility management network element and/or the foregoing session management network element, where the session management network element is configured to perform the method according to any one of the implementations of the first aspect, and the mobility management network element is configured to transmit a data packet between the session management network element and a terminal apparatus.

In an embodiment, the communications system may further include the terminal apparatus that interacts with the mobility management network element and/or the session management network element in the solution provided in the embodiments of this application.

In an embodiment, the communications system may further include a data forwarding network element that interacts with the mobility management network element and/or the session management network element in the solution provided in the embodiments of this application.

According to an eighteenth aspect, a chip system is provided, including a memory and a processor. The memory is configured to store a computer program. The processor is configured to invoke the computer program from the memory and run the computer program, so that a communications device on which the chip system is installed performs the method according to any one of the implementations of the first aspect or the second aspect.

The chip system may include an input circuit or interface configured to send information or data, and an output circuit or interface configured to receive information or data.

DESCRIPTION OF EMBODIMENTS

Figure 1:
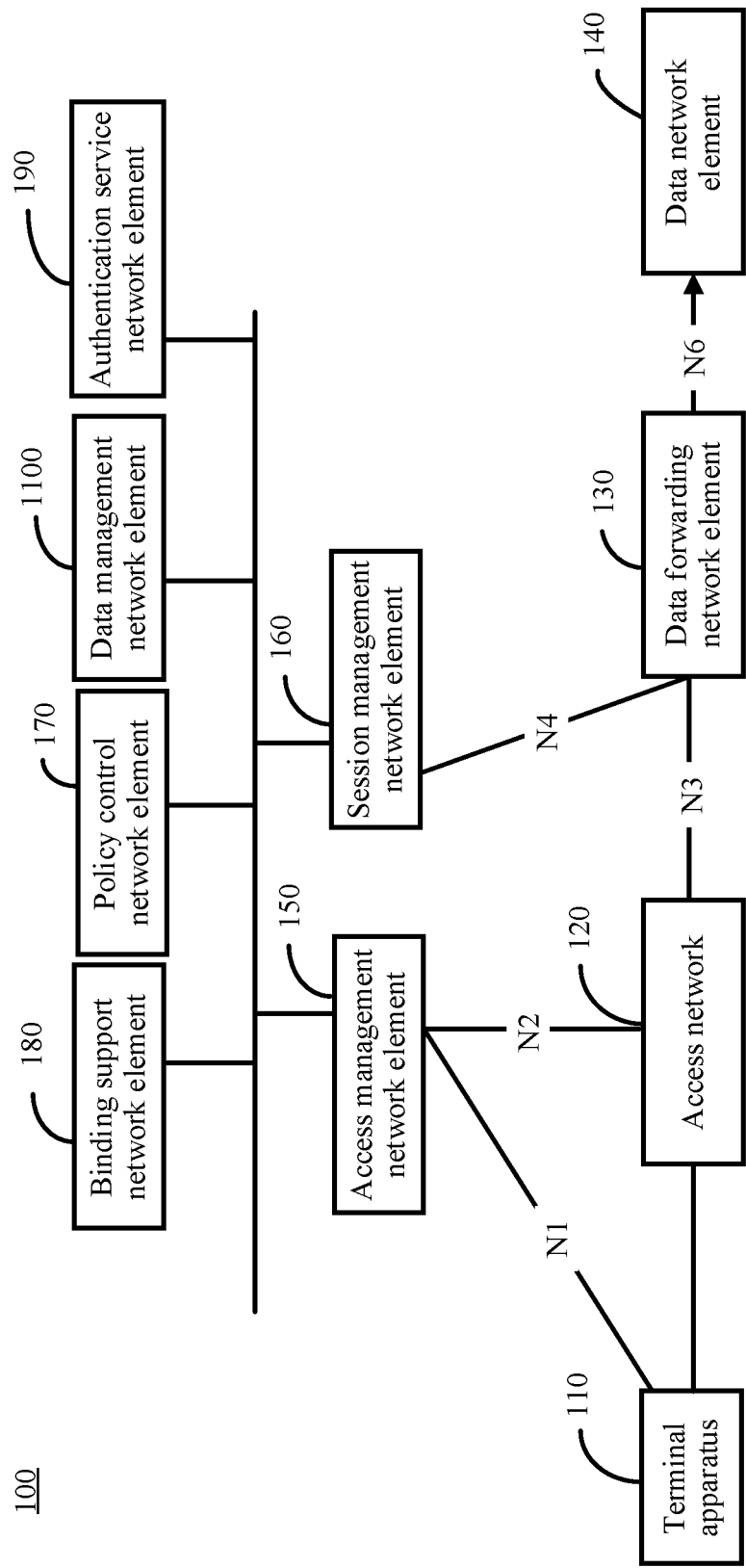
FIG. 1 is a schematic structural diagram of a network architecture in a 5G communications system.

The following describes the technical solutions of this application with reference to the accompanying drawings.

Terminologies such as "component", "module", and "system" used in this application are used to indicate computer-related entities, hardware, firmware, combinations of hardware and software, software, or software being executed. For example, a component may be, but is not limited to, a process that runs on a processor, a processor, an object, an executable file, an execution thread, a program, and/or a computer. As shown in figures, both a computing device and an application that runs on a computing device may be components. One or more components may reside within a process and/or an execution thread, and a component may be located on one computer and/or distributed between two or more computers. In addition, these components may be executed by various computer-readable media that store various data structures. For example, the components may communicate by using a local and/or remote process based on a signal having one or more data packets (for example, data from two components interacting with another component in a local system, a distributed system, and/or across a network such as the internet interacting with another system by using the signal).

The technical solution of the embodiments of this application may be used in various communications systems, for example, a global system for mobile communications (GSM) system, a code division multiple access (CDMA) system, a wideband code division multiple access (WCDMA) system, a general packet radio service (GPRS)

system, a long term evolution (LTE) system, an LTE frequency division duplex (FDD) system, an LTE time division duplex (TDD) system, a universal mobile telecommunications system (UMTS), a worldwide interoperability for microwave access (WiMAX) communications system, a 5th generation (5G) system, or a new radio (NR) system.

Generally, a conventional communications system supports a limited quantity of connections and is easy to implement. However, with development of communications technologies, a mobile communications system not only supports conventional communication, but also supports, for example, device-to-device (D2D) communication, machine to machine (M2M) communication, machine type communication (MTC), and vehicle to everything (V2X) communication, for example, vehicle to vehicle (V2V) communication, vehicle to infrastructure (V2I) communication, vehicle to pedestrian (V2P) communication, and vehicle to network (V2N) communication. In addition, the communications system may alternatively be a public land mobile network (PLMN) network, an internet of things (IoT) network, or another network.

The embodiments of this application are described with reference to a terminal apparatus. The terminal apparatus may also be referred to as user equipment (UE), an access terminal, a subscriber unit, a subscriber station, a mobile station, a mobile console, a remote station, a remote terminal, a mobile device, a user terminal, a terminal, a wireless communications device, a user agent, or a user apparatus. The terminal apparatus may be a station (ST) in WLAN, a cellular phone, a cordless phone, a session initiation protocol (SIP) phone, a wireless local loop (WLL) station, a personal digital assistant (PDA) device, a handheld device having a wireless communication function, a computing device, another processing device connected to a wireless modem, a vehicle-mounted device, an internet of vehicles terminal, a computer, a laptop computer, a handheld communications device, a handheld computing device, a satellite wireless device, a wireless modem card, a television set-top box (STB), customer premise equipment (CPE) and/or another device configured to perform communication in a wireless system, a terminal apparatus in a next generation communications system, for example, a 5G network, or a terminal apparatus in a future evolved public land mobile network (PLMN) network.

As an example instead of a limitation, the terminal apparatus in the embodiments of this application may alternatively be a wearable device. The wearable device may also be referred to as a wearable intelligent device, and is a general term for wearable devices such as glasses, gloves, watches, clothes, and shoes that are developed by applying wearable technologies in intelligent designs of daily wear. The wearable device is a portable device that can be directly worn by a user or integrated into clothes or an accessory of a user. The wearable device is not only a hardware device, but is used to implement a powerful function through software support, data exchange, and cloud interaction. Generalized wearable intelligent devices include full-featured and large-size devices that can implement complete or partial functions without depending on smartphones, for example, smart watches or smart glasses, and devices that focus on only one type of application and need to work with other devices such as smartphones, such as various smart bands or smart jewelry for monitoring physical signs.

In addition, the terminal apparatus in the embodiments of this application may alternatively be a terminal apparatus in an IoT system. The IoT is an important part of future development of information technologies. A main technical feature of the IoT is connecting a thing to a network by using a communications technology, to implement an intelligent network for interconnection between a person and a machine or between one thing and another.

A basic service that can be provided by a core network includes mobile office, e-commerce, communication, an entertainment service, a travel and location-based service, a telemetry service, a simple message transfer service (monitoring and control), or the like. Main functions of the core network are to provide a user connection, user management, and a service bearer, and the core network functions as a bearer network to provide an interface to an external network. The establishment of the user connection includes functions such as mobility management (MM), call management (CM), switching/routing, and recording notification. The user management includes user description, quality of service (QoS), user communication accounting, virtual home environment (VHE), and security (corresponding security measures provided by an authentication center, including security management for a mobile service and security processing for external network access). The bearer access includes a public switched telephone network (PSTN) to the outside, an external circuit data network and a packet data network, an internet and an intranet, a short message service (SMS) server of a mobile network itself, and the like.

As an example instead of a limitation, a core network device may include functional units such as an access and mobility management function (AMF), a session management function (SMF), a policy control function (PCF), and a user plane function (UPF). The functional units may work independently, or may be combined together to implement some control functions. For example, the AMF, the SMF, and the PCF may be combined together as a management device to implement access control and mobility management functions such as access authentication, security encryption, and location registration of the terminal apparatus; session management functions such as establishment, release, and modification of a user plane transmission path; and functions such as analysis of data (such as congestion) related to slice and terminal apparatus-related data. The UPF mainly completes a function such as routing and forwarding of user plane data, for example, data packet filtering, data transmission/forwarding, rate control, and charging information generation for the terminal apparatus.

An access network (AN) includes a series of transport entities (such as line equipment and transmission facilities) between a service network interface (SNI) and a user network interface (UNI). The access network is an implementation system that provides bearer capabilities required for transmitting a telecom service, and can be configured and managed through a management interface (Q3). In principle, there is no limitation on types and quantities of UNIs and SNIs that can be supported by the access network. Signaling is not parsed in the access network. The access network can be considered as a transport network that is independent of services and applications, and mainly implements functions of cross-connection, multiplexing, and transmission.

An access network device may include an access network/radio access network (RAN) device, and a network including a plurality of 5G-RAN nodes. The 5G-RAN node may be an access point (AP), a next-generation new base station (NR nodeB, gNB), a next-generation evolved NodeB (ng-eNB, gNB), a transmission reception point (TRP), a transmission point (TP), or another access node. There may be further a centralized unit (CU) and a distributed unit (DU) inside the 5G-RAN node.

In addition, the access network device may alternatively be a base transceiver station (BTS) in SM or CDMA, a NodeB (NB) in WCDMA, an evolved NodeB (eNB or eNodeB) in LTE, a relay station or an access point, a vehicle-mounted device, a wearable device, an access network device in a 5G network, an access network device in a future evolved PLMN network, or the like. This is not particularly limited in this application.

It should be noted that, in the embodiments of this application, the access network device serves a cell. The terminal apparatus communicates with the access network device by using a transmission resource (for example, a frequency domain resource or a spectrum resource) used by the cell. The cell may be a cell corresponding to the access network device (for example, a base station). The cell may belong to a macro base station, or a base station corresponding to a small cell. The small cell herein may include a metro cell, a micro cell, a pico cell, a femto cell, or the like. The small cells have features of small coverage and low transmit power, and are suitable for providing a high-rate data transmission service.

In addition, a plurality of cells may simultaneously work in a same frequency band on a carrier in the LTE system or the 5G system. In some special scenarios, the concept of the carrier is considered equivalent to that of the cell. For example, in a carrier aggregation (CA) scenario, both a carrier index of a secondary component carrier and a cell identifier (Cell ID) of a secondary cell that works on the secondary component carrier are carried when the secondary component carrier is configured for UE. In this case, the concept of the carrier is considered equivalent to that of the cell. For example, that the UE accesses a carrier is equivalent to that the UE accesses a cell.

The access network device may send data or information to the terminal apparatus through a forward link (also referred to as a downlink), and receive data or information from the terminal apparatus through a reverse link (also referred to as an uplink).

For example, in a frequency division duplex (FDD) system, for example, the forward link and the reverse link may have different frequency bands.

For another example, in a time division duplex (TDD) system and a full-duplex system, the forward link and the reverse link may have a same frequency band.

Each antenna (or antenna group including a plurality of antennas) and/or each area designed for communication are/is referred to as a sector of the access network device.

For example, an antenna group may be designed to communicate with a terminal apparatus in a sector within coverage of the access network device. The access network device may send signals to all terminal apparatuses in the corresponding sector by using a single antenna or a multi-antenna transmit diversity.

In a process in which the access network device communicates with the terminal apparatus through the forward link, a transmit antenna of the access network device may also improve a signal-to-noise ratio of the forward link through beamforming.

In addition, interference to a mobile device in a neighboring cell when the access network device sends signals through beamforming to terminal apparatuses that are randomly scattered in related coverage is less than that in a manner in which the access network device sends, by using a single antenna or a multi-antenna transmit diversity, signals to all terminal apparatuses served by the access network device.

At a given time, the access network device or the terminal apparatus may be a wireless communications sending apparatus and/or a wireless communications receiving apparatus. When sending data, the wireless communications sending apparatus may encode data for transmission. The wireless communications sending apparatus may obtain (for example, generate, receive from another communications apparatus, or store in a memory) a specific quantity of data bits to be sent on a channel to the wireless communications receiving apparatus. The data bits may be included in a transport block (or a plurality of transport blocks) of the data, and the transport block may be segmented to generate a plurality of code blocks.

In the embodiments of this application, the terminal apparatus, the core network device, or the access network device includes a hardware layer, an operating system layer running above the hardware layer, and an application layer running above the operating system layer. The hardware layer includes hardware such as a central processing unit (CPU), a memory management unit (MMU), and a memory (also referred to as a main memory). The operating system may be any one or more computer operating systems that implement service processing by using a process, for example, a Linux operating system, a Unix operating system, an Android operating system, an iOS operating system, or a windows operating system. The application layer includes applications such as a browser, an address book, word processing software, and instant messaging software. In addition, a structure of an entity for performing the method according to the embodiments of this application is not particularly limited in the embodiments of this application, provided that a program recording code of the method according to the embodiments of this application can be run to perform communication according to the method according to the embodiments of this application. For example, the entity for performing the method according to the embodiments of this application may be the terminal apparatus, the core network device, or the access network device, or may be a functional module, in the terminal apparatus, the core network device, or the access network device, that is capable of invoking and executing the program.

In addition, aspects or features in the embodiments of this application may be implemented as a method, an apparatus, or a product that uses standard programming and/or engineering technologies. The term "product" used in this application covers a computer program that can be accessed from any computer-readable component, carrier or medium. For example, the computer-readable medium may include but is not limited to: a magnetic storage component (for example, a hard disk, a floppy disk, or a magnetic tape), an optical disc (for example, a compact disc (CD) or a digital versatile disc (DVD)), a smart card, and a flash memory component (for example, an erasable programmable read-only memory (EPROM), a card, a stick, or a key drive). In addition, various storage media described in this specification may indicate one or more devices and/or other machine-readable media that are configured to store information. The term "machine-readable media" may include but is not limited to a radio channel, and various other media that can store, contain, and/or carry an instruction and/or data.

It should be noted that in the embodiments of this application, a plurality of application programs may be run at the application layer. In this case, an application program for performing the method in the embodiments of this application and an application program configured to control a receive end device to implement an action corresponding to received data may be different application programs.

FIG. 1 shows a network architecture used in an embodiment of this application. The following separately describes network elements that may be in the network architecture.

1. A terminal apparatus 110 may include various handheld devices that have a wireless communication function, vehicle-mounted devices, wearable devices, computing devices or other processing devices connected to a wireless modem, and terminals in various forms, for example, a mobile station (MS), a terminal, user equipment (UE), and a soft client. For example, the terminal apparatus 110 may be a water meter, an electricity meter, or a sensor. In addition, the terminal apparatus 110 may alternatively be a chip.

2. A (radio) access network ((R)AN) network element 120 is configured to provide a network access function for an authorized terminal apparatus in a specific area, and can use transmission tunnels with different quality based on a level, a service requirement, and the like of the terminal apparatus.

The (R)AN network element can manage radio resources and provide an access service for the terminal apparatus, to forward a control signal and data of the terminal apparatus between the terminal apparatus and a core network. The (R)AN network element may alternatively be understood as a base station in a conventional network.

3. A data forwarding network element 130 is also referred to as a user plane network element, and may be used for packet routing and forwarding, quality of service (QoS) processing of user plane data, and the like.

In a 5G communications system, the user plane network element may be a user plane function (UPF) network element. In a future communications system, the user plane network element may still be a UPF network element, or may have another name. This is not limited in this application. For example, the UPF mainly provides user-plane service processing functions, including service routing, packet forwarding, anchoring, quality of service (QoS) mapping and execution, identification of an uplink identifier and routing the identifier to a data network, downlink packet buffering, triggering notification of downlink data arrival, and connection to an external data network.

4. A data network element 140 is configured to provide a network for data transmission.

In the 5G communications system, the data network element may be a data network (DN) network element. In a future communications system, the data network element may still be a DN network element, or may have another name. This is not limited in this application.

5. An access management network element 150 is mainly configured to perform mobility management, access management, and the like, and may be configured to implement functions, for example, lawful interception and access authorization/authentication, other than session management in functions of a mobility management entity (MME).

In the 5G communications system, the access management network element may be an access and mobility management function (access and mobility management function, AMF) network element. In a future communications system, the access management network element may still be an AMF network element, or may have another name. This is not limited in this application.

6. A session management network element 160 is mainly configured to manage a session, assign and manage an Internet Protocol (internet protocol, IP) address of a terminal apparatus, select a termination point that can manage a user plane function interface and a policy control and charging function interface, notify downlink data, and the like.

In the 5G communications system, the session management network element may be a session management function (session management function, SMF) network element. In a future communications system, the session management network element may still be an SMF network element, or may have another name. This is not limited in this application.

7. A policy control network element 170 is configured to: guide a unified policy framework for network behavior, and provide policy rule information for a control plane function network element (such as an AMF or an SMF network element), and the like.

In a 4G communications system, the policy control network element may be a policy and charging rules function (policy and charging rules function, PCRF) network element. In the 5G communications system, the policy control network element may be a policy control function (policy control function, PCF) network element. In a future communications system, the policy control network element may still be a PCF network element, or may have another name. This is not limited in this application.

8. A binding support network element 180 is configured to search for a PCF associated with a session.

In the 5G communications system, the binding support network element may be a binding support function (binding support function, BSF) network element. In a future communications system, the binding support network element may still be a BSF network element, or may have another name. This is not limited in this application.

9. An authentication server 190 is configured to authenticate a service, generate a key to implement bidirectional authentication for a terminal apparatus, and support a unified authentication framework.

In the 5G communications system, the authentication server may be an authentication server function (authentication server function, AUSF) network element. In a future communications system, the authentication server function network element may still be an AUSF network element, or may have another name. This is not limited in this application.

10. A data management network element 1100 is configured to process a terminal apparatus identifier, perform access authentication, registration, and mobility management, and the like.

In the 5G communications system, the data management network element may be a unified data management (unified data management, UDM) network element. In a future communications system, the unified data management network element may still be a UDM network element, or may have another name. This is not limited in this application.

11. An application network element is configured to perform application-affected data routing, access a network exposure function network element, interact with a policy framework to perform policy control, and the like.

In the 5G communications system, the application network element may be an application function (application function, AF) network element. In a future communications system, the application network element may still be an AF network element, or may have another name. This is not limited in this application.

12. A network storage network element is configured to maintain real-time information of all network function services in a network.

In the 5G communications system, the network storage network element may be a network repository function (network repository function, NRF) network element. In a future communications system, the network storage network element may still be an NRF network element, or may have another name. This is not limited in this application.

A set of network elements such as the AMF, the SMF, and the UDM may be referred to as a control plane function (Control Plane Function, CPF) network element.

It should be noted that the "network element" may also be referred to as an entity, a device, an apparatus, a module, or the like. This is not particularly limited in this application. In addition, for ease of understanding and description, descriptions of the "network element" are omitted in some descriptions of this application. For example, the SMF network element is referred to as an SMF for short. In this case, the "SMF" should be understood as an SMF network element or an SMF entity. Descriptions of same or similar cases are omitted below.

It may be understood that the foregoing network element or function may be a network element in a hardware device, a software function running on dedicated hardware, or a virtualized function instantiated on a platform (for example, a cloud platform).

In the network architecture, N1 is a reference point between the terminal apparatus 110 and the AMF network element 160, and is used for sending a non-access stratum (non-access stratum, NAS) message. N2 is a reference point between the RAN network element 120 and the AMF network element 160, and is used for sending an N2 message, a NAS message, and the like. N3 is a reference point between the RAN network element 120 and the UPF network element 130, and is used for transmitting user plane data and the like. N4 is a reference point between the SMF network element 170 and the UPF network element 130, and is used for transmitting information such as interface identification information of an N3 interface, data buffering indication information, and a downlink data notification message.

It should be understood that network elements included in the foregoing network architecture are merely examples for description, and this application is not limited thereto. For example, the network elements may further include but are not limited to:

a network exposure function (network exposure function, NEF), configured to securely open, to outside, a service and a capability that are provided by a 3GPP network function;

a unified data management (unified data management, UDM), configured for user identifier processing, access authentication, registration, mobility management, and the like; and a network data analysis (network data analysis, NWDA) network element, configured to collect and store information from a terminal apparatus, a RAN network element, and another network entity (for example, an AMF network element); analyze the information and generate context information (which may be considered as information about an application layer) about a user; and distribute information of the application layer.

It should be understood that the foregoing network architecture used in the embodiments of this application is merely an example, and a network architecture applicable to the embodiments of this application is not limited thereto. Any network architecture that can implement functions of the foregoing network elements is applicable to the embodiments of this application.

Figure 2:
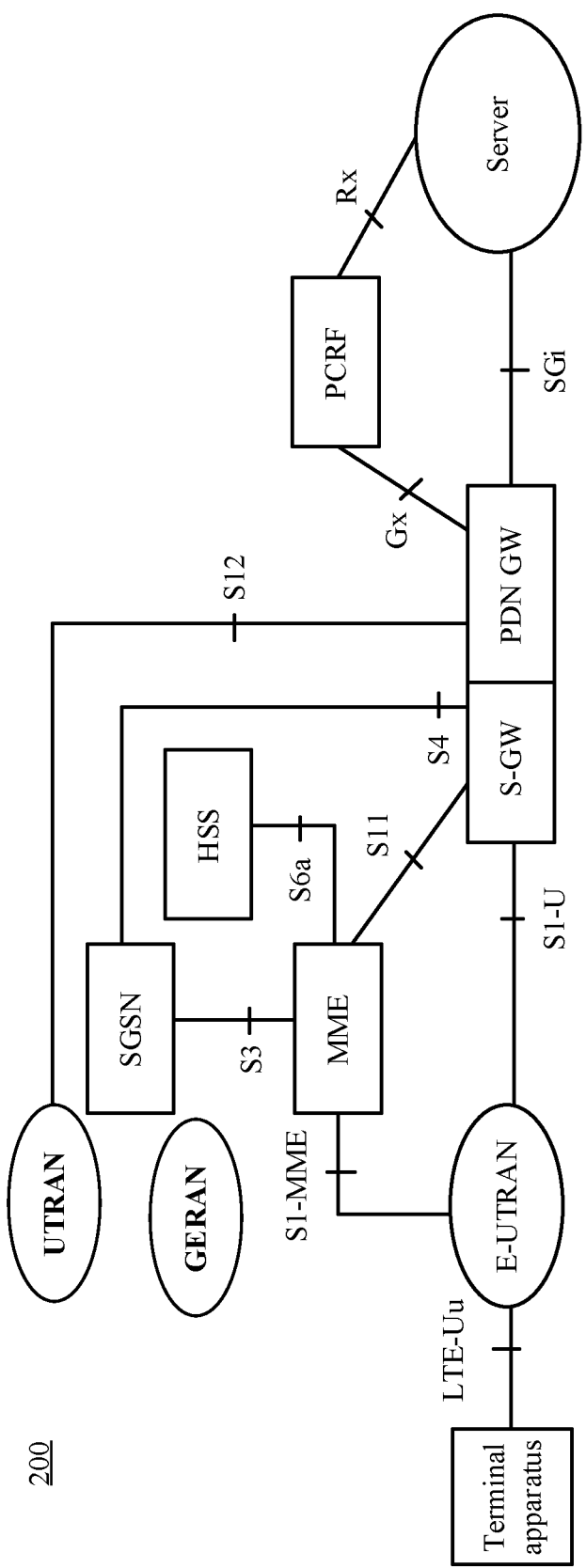
FIG. 2 is a schematic structural diagram of an EPC network architecture.

FIG. 2 is a schematic diagram of an evolved packet core (Evolved Packet Core, EPC) network architecture used in an embodiment of this application. The following separately describes network elements that may be in the network architecture.

The network architecture includes an evolved universal terrestrial radio access network (evolved terrestrial radio access network, E-UTRAN), an access network (GSM edge radio access network, GERAN), a serving GPRS support node (Serving GPRS Support Node, SGSN), a home subscriber server (home subscriber server, HSS), a policy and charging rules function (policy and charging rules function, PCRF), and a server. The network architecture is used in a non-roaming scenario, and a radio access network of the network architecture is an evolved universal terrestrial radio access network. Key logical network elements of the evolved packet core network include a mobility management entity (mobility management entity, MME), a serving gateway (serving gateway, SGW), and a packet data network gateway (packet data network gateway, PGW).

The MME mainly completes processing of signaling plane functions, such as user authentication, handover, mobility management of a terminal in idle mode, user context management, and bearer management.

The SGW is a user plane function entity that can route and forward packet data. The SGW serves as a data anchor in the 3rd Generation Partnership Project (3rd Generation Partnership Project, 3GPP) system, an interface to terminate the E-UTRAN, and also an anchor for local mobility management in the E-UTRAN handover scenario in a specific geographical area.

The PGW is a GW connected to an external data network, and is a user plane anchor between a 3GPP access network and a non-3GPP access network. User equipment may access an external PDN by connecting to the PGW to create a packet data network (packet data network, PDN) connection, where the PDN may be a network, a virtual private network, an IP multimedia service network, a wireless application protocol network provided by an operator, or the like.

In actual network deployment, the logical network elements SGW and PGW can be separated or combined. Except for some special cases (such as roaming), the logical network elements SGW and PGW are jointly deployed. The GW in the embodiments of this application may be a collective name of the logical network elements SGW and PGW.

It should be further understood that, in the embodiments of this application, the PDN, the GW, and the MME are names in an LTE network architecture, and respectively correspond to a packet data unit (packet data unit, PDU), a forwarding plane network element, and a control plane network element in another network.

In conclusion, because network architectures are different, a network element in the network architecture shown in FIG. 1 may not correspond to any network element in the network architecture shown in FIG. 2. For ease of description, in this application, a network element entity is described by using a function of a network element. For example, a mobility management network element may be an AMF or an MME. A session management network element may be an SMF, a PGW, or a PGW control plane function (PGW-Control plane, PGW-C). A data forwarding network element may be a UPF, a PGW, or a PGW user plane function (PGW-User plane, PGW-U). For a method for implementing a chip in an apparatus entity, refer to specific descriptions of the apparatus entity. Details are not described again.

Figure 3:
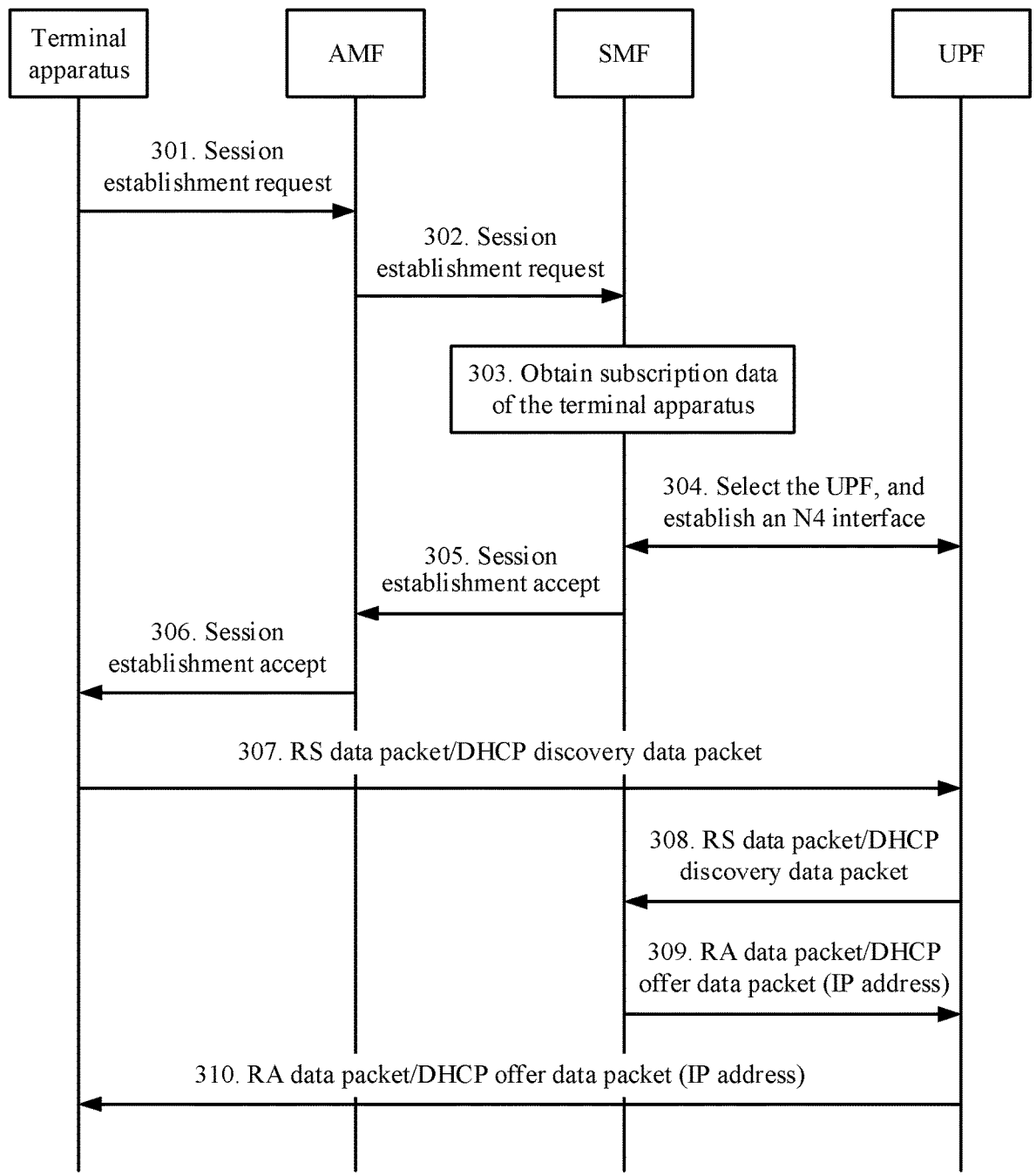
FIG. 3 is a schematic interaction diagram of a method for allocating and obtaining an IP address.

FIG. 3 is a schematic interaction diagram of a session establishment procedure and an IP address allocation procedure performed in the network architecture shown in FIG. 1.

301. A terminal apparatus sends a session establishment request (for example, a PDU session establishment request) message to an AMF, to initiate a session establishment procedure.

302. After receiving the session establishment request sent by the terminal apparatus, the AMF selects an SMF; forwards the session establishment request message to the SMF, and sends control plane transmission indication information (for example, control plane cellular IoT 5GS optimization indication) to the SMF.

303. The SMF obtains subscription data of UE from a UDM.

304. The SMF selects a UPF network element and establishes an N4 interface.

305. The SMF sends a session establishment accept (for example, PDU session establishment accept) message to the AMF.

306. The AMF forwards the session establishment accept message to the UE.

307. The UE sends an uplink data packet to the UPF via a RAN, where the uplink data packet may carry an IP address request. The uplink data packet may be, for example, a router solicitation (RS) data packet or a dynamic host configuration protocol (DHCP) discovery data packet. The UPF may be an anchor of a session.

308. The UPF forwards the uplink data packet to the SMF, so that the SMF allocates an IP address to the AMF.

309. The SMF sends a downlink data packet carrying the IP address to the UPF. When the uplink data packet is the RS packet, the downlink data packet may be a router advertisement (RA) data packet; or when the uplink data packet is the DHCP discovery data packet, the downlink data packet may be a DHCP offer data packet.

310. The UPF forwards the downlink data packet to the terminal apparatus via the RAN.

The IP address allocation is complete.

Steps 301 to 306 constitute the session establishment procedure.

A feature of data transfer in a control plane cellular internet of things 5G system optimization (data transfer in control plane CIoT 5GS optimization) is introduced into a 5G communications system, so that the terminal apparatus can transmit data via a control plane network element. In other words, the terminal apparatus sends a non-access stratum (NAS) packet to implement data transmission between the terminal apparatus and a core network device. A control plane data transmission path may be from the terminal apparatus to the AMF, the SMF, and the UPF. However, when the session supports control plane data transmission, there is no N3 interface between the RAN and the UPF. Therefore, the terminal apparatus cannot obtain the IP address through a user plane transmission path between the RAN and the UPF in the manner shown in FIG. 3.

Figure 4:
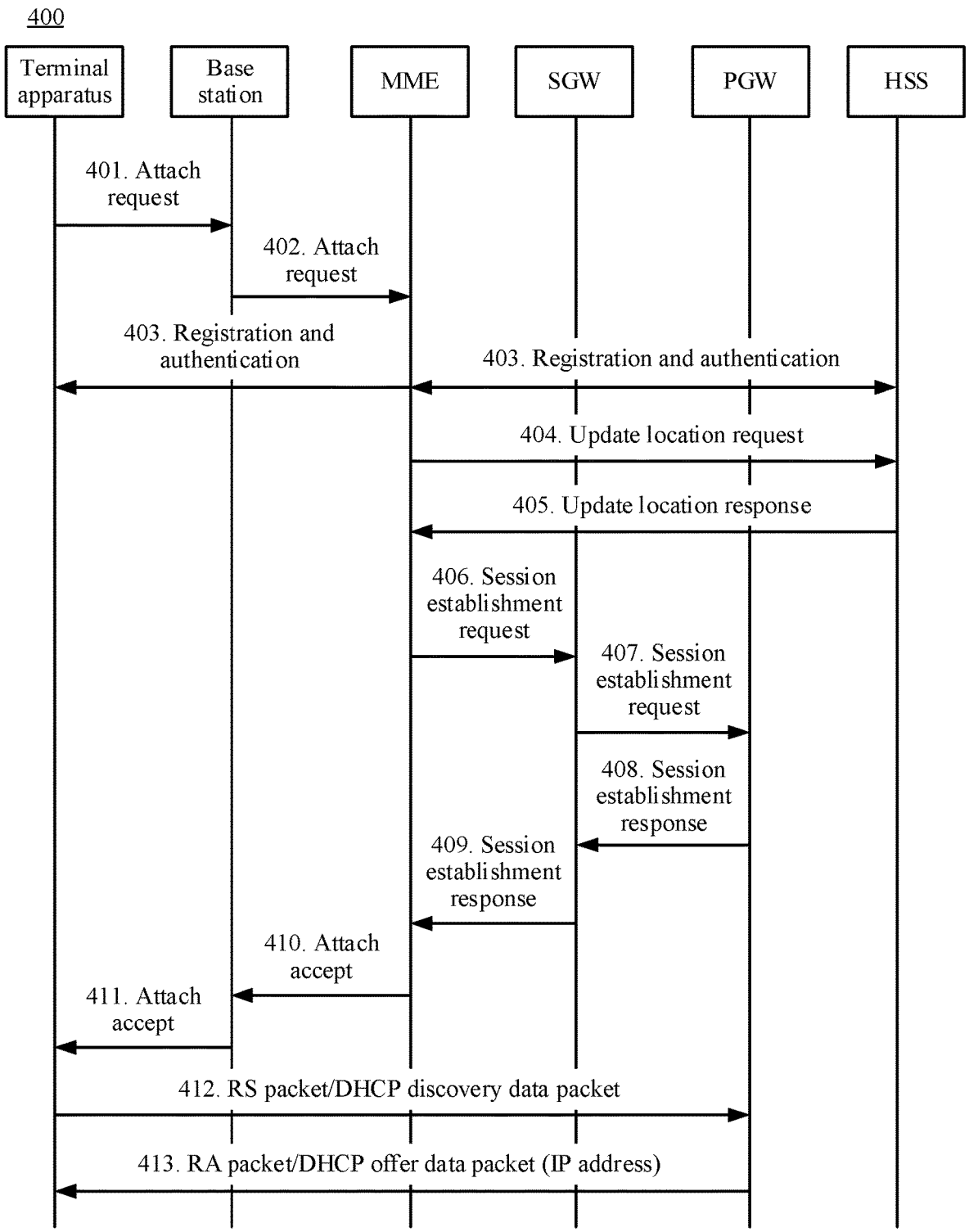
FIG. 4 is a schematic interaction diagram of a method for allocating and obtaining an IP address.

FIG. 4 shows an attach procedure and an IP address allocation procedure performed in the network architecture shown in FIG. 2.

401. A terminal apparatus sends an attach request message to a base station.

402. The base station forwards the attach request message to an MME.

403. When registration information of the terminal apparatus is stored, an HSS interacts with the MME to complete registration authentication.

404. The MME sends an update location request message to the HSS.

405. The HSS sends an update location response message to the MME.

406. The MME sends a create session request message to an SGW.

407. The SGW forwards the session establishment request message to the PGW.

408. The PGW sends a create session response message to the SGW, where the session establishment response includes an interface ID (identity) allocated to the terminal apparatus and an IPv6 prefix.

409. The SGW forwards the session establishment response message to the MME.

410. The MME sends an attach accept message to the base station, where the attach accept message includes a link-local address corresponding to the interface ID.

411. The base station forwards the attach accept message to the terminal apparatus.

412. Because only the terminal apparatus and the PGW are on the link at this time, the terminal apparatus may send an uplink data packet to the PGW based on the link-local address in the attach accept message to request the IPv6 prefix. The uplink data packet may be an RS packet or a DHCP discovery data packet.

413. The PGW sends a downlink data packet to the terminal apparatus, so that the UE obtains the IPv6 prefix, and the terminal apparatus may obtain an IP address based on the IPv6 prefix and the link-local address. When the uplink data packet is the RS packet, the downlink data packet may be an RA packet; or when the uplink data packet is the DHCP discovery data packet, the downlink data packet may be a DHCP offer data packet.

The IP address allocation is complete.

Steps 401 to 411 constitute the attach procedure. The attach procedure is similar to the session establishment procedure shown in FIG. 3.

A control plane cellular Internet of Things EPS optimization (control plane CIoT EPS optimization) data transmission mechanism similar to the feature of the control plane CIoT 5GS optimization in the 5G communications system is introduced into an EPC network architecture, so that the terminal apparatus can transmit data via a control plane network element, and a data transmission path may be from the terminal apparatus to the MME, the SGW, and the PGW. However, when the session supports EPS control plane data transmission, there is no user plane connection between the RAN and the SGW. That is, when the SGW receives the IP address sent by the PGW, the SGW cannot send the IP address to the terminal apparatus via the RAN. Therefore, the terminal apparatus cannot obtain the IP address in the manner shown in FIG. 4.

For a problem that may occur in the scenarios shown in FIG. 1 to FIG. 4, this application provides a method for allocating and obtaining an IP address, to improve flexibility of obtaining an IP address by a terminal apparatus.

Figure 5:
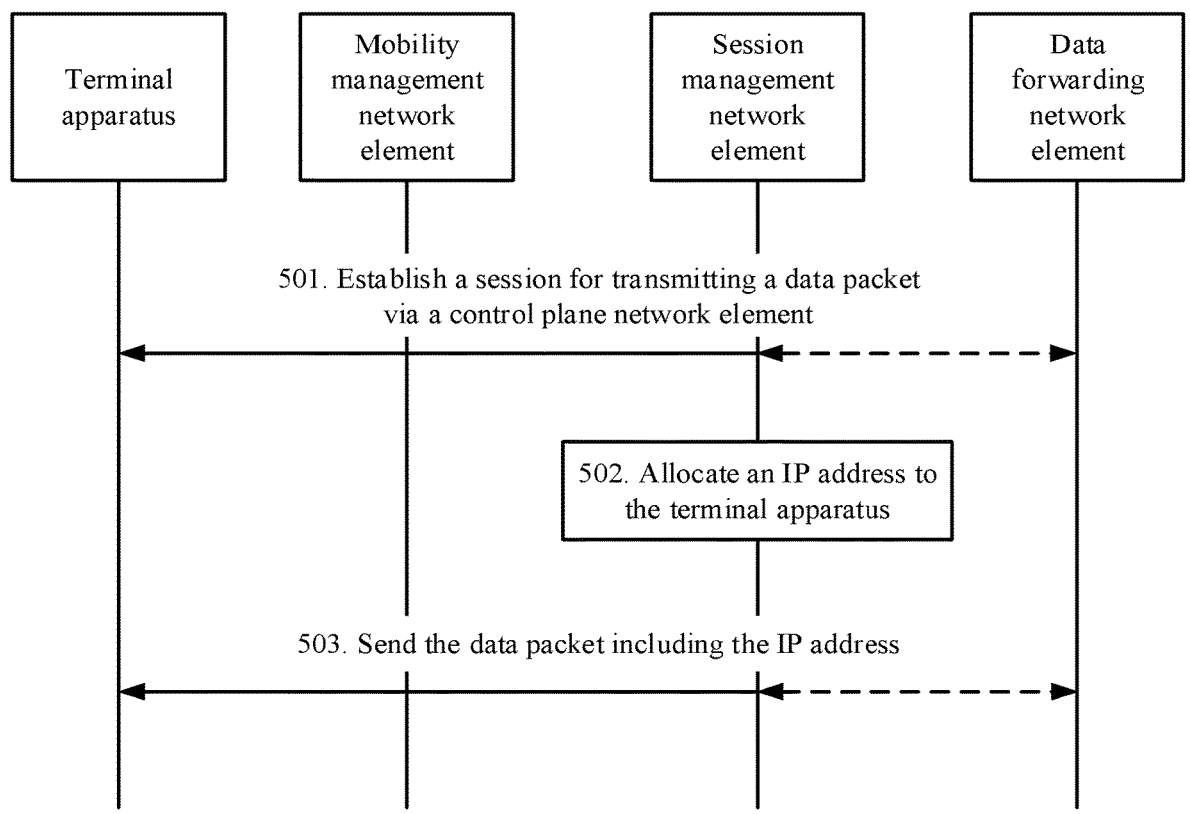
FIG. 5 is a schematic interaction diagram of a method for allocating and obtaining an IP address according to an embodiment of this application.

FIG. 5 is a schematic interaction diagram of a method for allocating and obtaining an IP address according to this application.

501. Establish a session for transmitting a data packet via a control plane network element.

That the data packet is transmitted via the control plane network element means that the session is used for data exchange between a terminal apparatus and the control plane network element. The control plane network element may be one or more of a mobility management network element and a session management network element, for example, may be an AMF and an SMF; or for another example, may be an MME, an SGW, and a PGW.

For example, the mobility management network element is an AMF, and the session management network element is an SMF; or the mobility management network element is an MME, and the session management network element is a PGW.

The session type may be IPv6, IPv4v6, IPv4, or another similar session type. The session management network element may determine a type of an IP address based on the session type.

The terminal apparatus may further exchange data with a data forwarding network element by using the session for transmitting the data packet via the control plane network element.

A session establishment procedure may include:

1. The terminal apparatus sends a session establishment request message to the mobility management network element.

The session establishment request message may be, for example, the session establishment request (for example, a PDU session establishment request) message in the session establishment procedure shown in FIG. 3, or may be the attach request message in the attach procedure shown in FIG. 4. The session establishment request message may carry a session identifier (for example, a PDU session ID) and indication information indicating the session type.

2. The mobility management network element forwards the session establishment request message to the session management network element.

Because the session is a session for transmitting the data packet via the control plane network element, the mobility management network element may send first indication information to the session management network element during forwarding of the session establishment request message. In other words, the mobility management network element sends a request message to the session management network element, and the message includes the session establishment request message and the first indication information. The first indication information is used to indicate, to the session management network element, that the session is a session for transmitting a data packet via the control plane network element.

For example, the first indication information includes control plane data transmission indication information. The control plane data transmission indication information may be, for example, control plane CIoT 5GS optimization indication information in a 5G communications system, or may be control plane CIoT EPS optimization indication information in an EPC network architecture.

3. The session management network element receives the session establishment request message forwarded by the mobility management network element, and establishes the session for the terminal apparatus, where the session is used for transmitting the data packet via the control plane network element.

The session management network element receives the session establishment request message that is forwarded by the mobility management network element and that is from the terminal apparatus, and the first indication information sent by the mobility management network element. The session management network element may determine, based on the first indication information, that the session is a session for transmitting the data packet via the control plane network element, to establish the session for the terminal apparatus.

The session management network element may store the first indication information. After the session is established, the session management network element may determine, by invoking the first indication information, a network element to which the data packet is to be sent. The data packet includes an uplink data packet and a downlink data packet. The data packet may be an uplink data packet of a service and a downlink data packet of a service that are transmitted between the terminal apparatus and a network. Alternatively, the data packet may be an uplink data packet that is used by the terminal apparatus to request the network to allocate an IP address and a downlink data packet that is sent by the network and that includes an IP address.

The first indication information may be the control plane data transmission indication information, for example, the control plane CIoT 5GS optimization indication information in the 5G communications system, or the control plane CIoT EPS optimization indication information in the EPC network architecture. The session management network element may forward the downlink data packet based on the first indication information via the mobility management network element.

Optionally, in addition to the control plane CIoT 5GS optimization indication information in the 5G communications system or the control plane CIoT EPS optimization indication information in the EPC network architecture, the first indication information may be other indication information.

In an example, the first indication information may indicate the session management network element to send the downlink data packet to the mobility management network element. In other words, the session management network element may send the downlink data packet to the terminal apparatus based on the first indication information via the mobility management network element, and does not forward the downlink data packet via another control plane network element, for example, the data forwarding network element.

In an example, the first indication information may indicate the session management network element not to send the downlink data packet to the data forwarding network element. In other words, the session management network element may not send the downlink data packet to the terminal apparatus based on the first indication information via the data forwarding network element, but forwards the downlink data packet via another control plane network element, for example, the mobility management network element.

In an example, the first indication information may indicate the session management network element to send the uplink data packet to the data forwarding network element. In other words, the session management network element may send the uplink data packet to the data forwarding network element based on the first indication information.

In an example, the first indication information may indicate that the session management network element is the last network element that receives the uplink data packet, and the session management network element may parse the uplink data packet based on the first indication information, and construct a corresponding downlink data packet.

In an example, the first indication information may indicate that the data forwarding network element is the last network element that receives the uplink data packet, and the session management network element may send the uplink data packet to the data forwarding network element based on the first indication information.

In an example, the first indication information may further indicate the session management network element not to select the data forwarding network element in the session establishment procedure. The session management network element does not select the data forwarding network element in the session establishment procedure based on the first indication information. The session establishment procedure in the 5G communications system shown in FIG. 3 is used as an example. When the session management network element does not receive the first indication information, the session management network element selects the data forwarding network element in the session establishment procedure, that is, establishes an N4 interface. However, when the session management network element receives the first indication information, the session management network element does not select the data forwarding network element in the session establishment procedure, that is, does not establish an N4 interface. Therefore, the session management network element may not send the uplink data packet to the data forwarding network element.

The first indication information may further indicate an occasion for the session management network element to select the data forwarding network element.

In an example, the first indication information indicates to select the data forwarding network element after the session is established. The session establishment procedure in the 5G communications system shown in FIG. 3 is still used as an example. When the session management network element does not receive the first indication information, the session management network element selects the data forwarding network element in the session establishment procedure, that is, establishes an N4 interface. However, when the session management network element receives the first indication information, the session management network element delays selection of the data forwarding network element, that is, delays establishment of the N4 interface. Therefore, the session management network element may not send the uplink data packet to the data forwarding network element.

Optionally, the session management network element determines, based on an indication of the terminal apparatus or the data forwarding network element, a network element to which the data packet is to be sent.

For example, in the session establishment procedure, the terminal apparatus sends indication information to the session management network element, where the indication information is used to indicate the session management network element to send the downlink data packet to the mobility management network element; or indicate the session management network element to send the uplink data packet to the data forwarding network element; or indicate the session management network element not to send the uplink data packet to the data forwarding network element; or indicate the session management network element not to select the data forwarding network element in the session establishment procedure; or indicate the session management network element of an occasion for selecting the data forwarding network element.

For another example, in the session establishment procedure, the data forwarding network element may send indication information to the session management network element, where the indication information is used to indicate the session management network element not to send the uplink data packet to the data forwarding network element; or indicate the session management network element to establish an N4 interface but not use the N4 interface temporarily; or indicate the session management network element of a starting occasion of the N4 interface.

Content and an effect of the indication information is similar to those of the first indication information. Details are not described herein again.

Optionally, the session establishment procedure may further include:

4. The session management network element selects the data forwarding network element.

In other words, the session management network element may determine, based on the indication information, whether to select the data forwarding network element in the session establishment procedure.

If the session management network element does not select the data forwarding network element, the session management network element does not send the uplink data packet to the data forwarding network element, and does not receive the downlink data packet from the data forwarding network element.

Optionally, the session management network element may select the data forwarding network element after the session is established.

Optionally, the session management network element may select the data forwarding network element after the session is established and before the session management network element sends the data packet to the terminal apparatus via the mobility management network element.

Optionally, the session management network element may select, based on the indication information sent by the terminal apparatus or the mobility management network element, the data forwarding network element after the session is established.

In other words, the session management network element may not select the data forwarding network element in the session establishment procedure based on the indication information. However, if the session management network element does not receive the indication information, the session management network element may select the data forwarding network element in the session establishment procedure.

In an example, the session management network element may determine, based on the foregoing first indication information, not to select the data forwarding network element in the session establishment procedure.

In an example, the session management network element may determine, based on fourth indication information sent by the terminal apparatus, not to select the data forwarding network element in the session establishment procedure. Alternatively, the session management network element may receive the fourth indication information sent by the terminal apparatus, where the fourth indication information may indicate the session management network element not to send the uplink data packet to the data forwarding network element; or the fourth indication information may indicate the session management network element not to select the data forwarding network element in the session establishment procedure; or the fourth indication information may indicate the session management network element to select the data forwarding network element at an occasion that is not in the session establishment procedure, for example, select the data forwarding network element after the IP address is allocated to the terminal apparatus. The fourth indication information may be carried in the session establishment request message sent by the terminal apparatus.

502. The session management network element allocates the IP address to the terminal apparatus.

The session management network element may directly construct the IP address based on the session type. That is, the session management network element constructs the IP address by itself. The session management network element may further request the IP address from another network element. For example, the session management network element may request the IP address from a DHCP server that has an IP address allocation function, and then the session management network element delivers the IP address.

In an example, when the session type is IPv4v6 or IPv6, the SMF may construct an RA packet, where the RA packet carries the IP address.

In an example, when the session type is IPv4, the SMF may construct a DHCP offer packet, where the DHCP offer packet carries the IP address.

Optionally, the session management network element may allocate the IP address to the terminal apparatus in response to an IP address request sent by the terminal apparatus.

For example, the session management network element may receive another packet or another message that is sent by the mobility management network element and that is used by the terminal apparatus to request a core network to allocate the IP address, and allocate the IP address to the terminal apparatus.

Optionally, the session management network element may allocate the IP address to the terminal apparatus in response to content of the uplink data packet.

For example, the session management network element may receive the uplink data packet that is sent by the mobility management network element and that is from the terminal apparatus, where the uplink data packet includes an RS packet or a DHCP discovery packet; and the session management network element may allocate the IP address to the terminal apparatus based on the uplink data packet. That is, the session management network element may allocate the IP address to the terminal apparatus after receiving the RS packet or the DHCP discovery packet.

Optionally, the session management network element may determine to allocate the IP address to the terminal apparatus in response to the indication information of the terminal apparatus, the mobility management network element, and the data forwarding network element.

In an example, the session management network element may allocate the IP address to the terminal apparatus based on the first indication information and the session type described above.

In an example, the session management network element receives second indication information sent by the terminal apparatus and the session type, where the second indication information is used to indicate the session management network element to allocate the IP address to the terminal apparatus. For example, the second indication information indicates that the uplink data packet is the RS packet or the DHCP discovery packet.

In an example, the session management network element may determine, based on third indication information sent by the data forwarding network element and the session type, to allocate the address to the terminal apparatus. For example, the third indication information is used to indicate that the uplink data packet includes the RS packet or the DHCP discovery packet.

503. The session management network element sends the data packet to the terminal apparatus via the mobility management network element, where the data packet includes the IP address.

In other words, the terminal apparatus may receive, via the mobility management network element, the IP address sent by the session management network element, where the IP address is carried in the data packet.

The data packet may be, for example, the RA packet or the DHCP offer packet, or the data packet may be another packet or another message used by the session management network element to send the IP address to the terminal apparatus.

The data packet received by the terminal apparatus may alternatively be forwarded by the data forwarding network element.

That is, the data packet may be forwarded by the data forwarding network element, or may not be forwarded by the data forwarding network element.

If the session management network element does not select the data forwarding network element in the session establishment procedure, the session management network element may further select the data forwarding network element based on an indication in a process of receiving uplink data.

The following further describes, by using FIG. 6 to FIG. 11, a method for allocating and obtaining an IP address according to this application.

Figure 6:
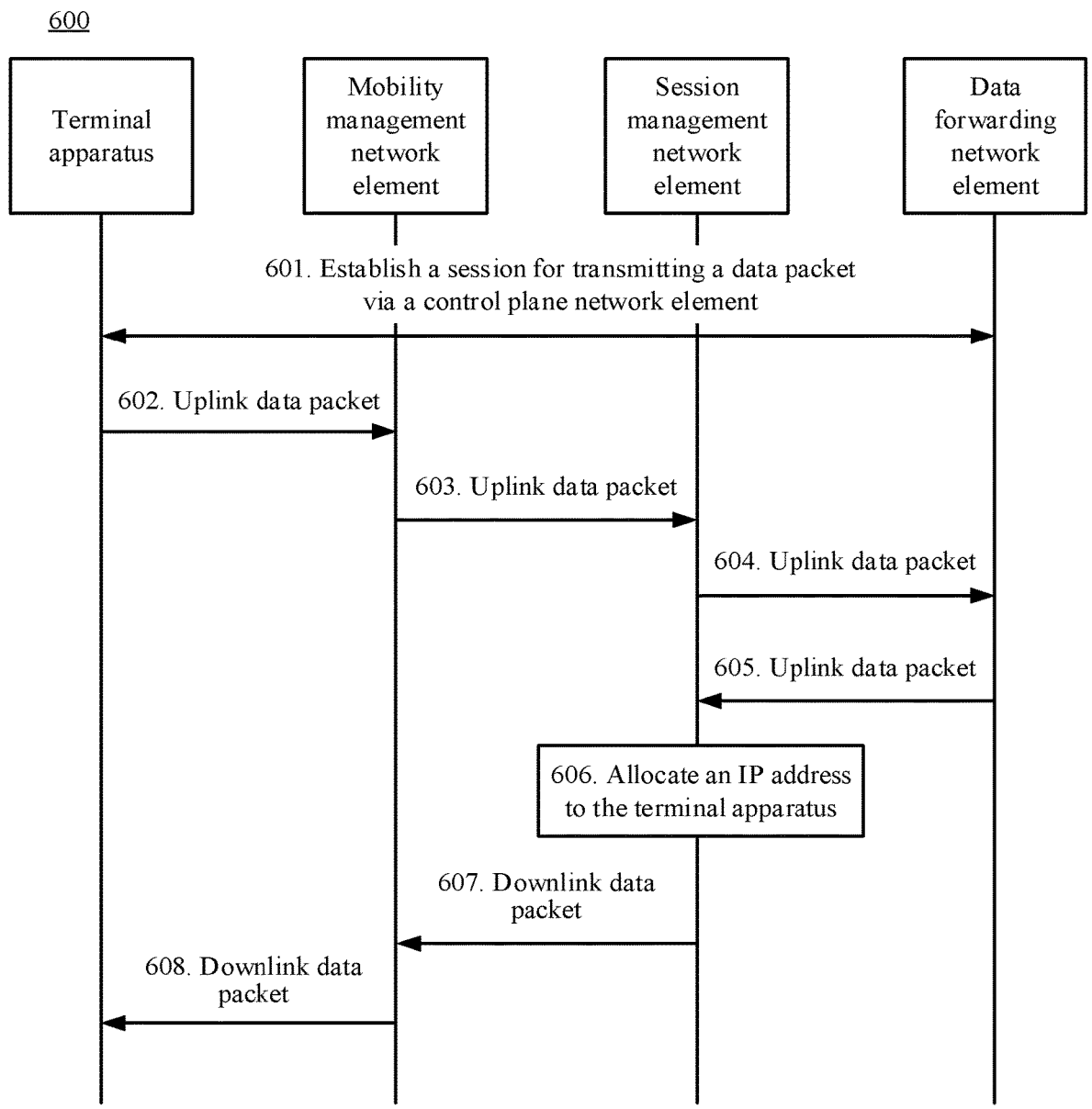
FIG. 6 is a schematic interaction diagram of a method for allocating and obtaining an IP address according to an embodiment of this application.

FIG. 6 is a schematic interaction diagram of a method for allocating and obtaining an IP address according to this application.

601. Establish a session for transmitting a data packet via a control plane network element.

For an example implementation of step 601, refer to step 501 in the embodiment shown in FIG. 5. Details are not described herein again.

In a session establishment procedure, a session management network element selects a data forwarding network element.

602. A terminal apparatus sends an uplink data packet to a mobility management network element to request an IP address.

The uplink data packet may be encapsulated in an uplink non-access stratum (NAS) message.

The uplink data packet may be, for example, an RS packet or a DHCP discovery data packet, or another packet or another message used by the terminal apparatus to request a core network to allocate the IP address.

The uplink data packet may carry a session identifier (ID).

603. The mobility management network element forwards the uplink data packet to the session management network element.

The mobility management network element may decapsulate the uplink NAS message to obtain the uplink data packet.

For example, the mobility management network element may invoke a PDU session message transfer service (Nsmf_PDUSession_Message_Transfer) of a session management function, to forward the uplink data packet to the mobility management network element.

604. The session management network element determines the data forwarding network element based on the session identifier, and forwards the uplink data packet to the data forwarding network element.

Because a packet check function is not enabled for the session management network element, the session management network element may not learn of all content of the uplink data packet. The session management network element needs to forward the uplink data packet to the data forwarding network element, and the data forwarding network element checks the uplink data packet.

605. The data forwarding network element indicates the content of the uplink data packet to the session management network element.

The session management network element may be triggered, based on the content of the uplink data packet, to allocate the IP address to the terminal apparatus.

606. The session management network element allocates the IP address to the terminal apparatus.

For an example implementation of step 606, refer to step 502 in the embodiment shown in FIG. 5. Details are not described herein again.

607. The session management network element sends a downlink data packet to the mobility management network element, where the downlink data packet includes the IP address.

For example, the session management network element may invoke an N1N2 interaction message transfer service (Namf_Communication_N1N2 Message Transfer) of a mobility management function, to send the downlink data packet to the mobility management network element.

When the uplink data packet is the RS packet, the downlink data packet may be an RA packet; or when the uplink data packet is the DHCP discovery packet, the downlink data packet may be a DHCP offer packet. Alternatively, the downlink data packet may be another packet or another message used by the session management network element to send the IP address to the terminal apparatus.

608. The mobility management network element forwards the downlink data packet to the terminal apparatus.

The mobility management network element may encapsulate the downlink data packet in a downlink NAS message.

As shown in FIG. 6, the terminal apparatus sends an IP address request message. Because the session management network element cannot directly obtain the content of the uplink data packet, the data forwarding network element needs to indicate the session management network element to allocate the IP address to the terminal apparatus.

Figure 7:
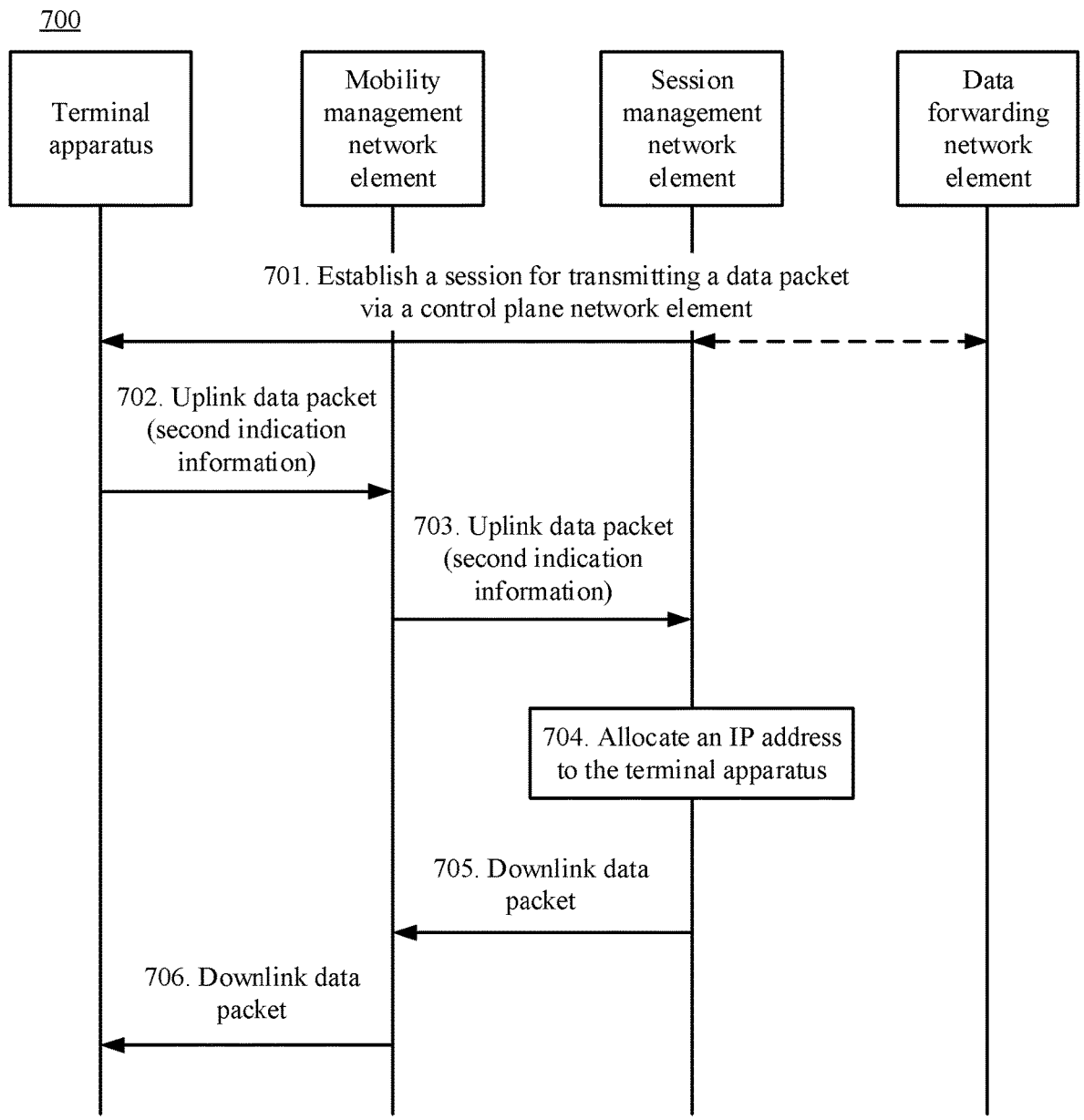
FIG. 7 is a schematic interaction diagram of a method for allocating and obtaining an IP address according to an embodiment of this application.

FIG. 7 is a schematic interaction diagram of a method for allocating and obtaining an IP address according to this application.

701. Establish a session for transmitting a data packet via a control plane network element.

For an example implementation of step 701, refer to step 501 in the embodiment shown in FIG. 5. Details are not described herein again.

In a session establishment procedure, a session management network element may select a data forwarding network element, or may not select a data forwarding network element.

For example, the session management network element may not select the data forwarding network element in the session establishment procedure based on indication information sent by a terminal apparatus or a mobility management network element in the session establishment procedure.

702. The terminal apparatus sends an uplink data packet to the mobility management network element to request an IP address, where the uplink data packet includes second indication information, and the second indication information is used to indicate the session management network element to allocate the IP address to the terminal apparatus.

The uplink data packet may be encapsulated in an uplink non-access stratum (NAS) message.

The uplink data packet may be, for example, an RS packet or a DHCP discovery packet, or another packet or another message used by UE to request a core network to allocate the IP address.

If the session management network element selects the data forwarding network element in the session establishment procedure:

the second indication information may indicate, for example, that the uplink data packet is the RS packet or the DHCP discovery packet, or another packet or another message used by the terminal apparatus to request the core network to allocate the IP address;

the second indication information may indicate, for example, the session management network element to send the data packet to the mobility management network element; or the second indication information may indicate, for example, the session management network element not to send the data packet to the data forwarding network element.

Optionally, the second indication information may be, for example, used to indicate the session management network element to allocate the IP address to the terminal apparatus.

If the session management network element does not select the data forwarding network element in the session establishment procedure:

the second indication information may indicate, for example, that the uplink data packet is the RS packet or the DHCP discovery packet.

Optionally, the second indication information may be used to indicate to select the data forwarding network element after the session is established and before the IP address is sent.

The uplink data packet may carry a session identifier (ID).

703. The mobility management network element forwards the uplink data packet to the session management network element.

The mobility management network element may decapsulate the uplink NAS message to obtain the uplink data packet.

For example, the mobility management network element may invoke Nsmf_PDUSession_Message Transfer to forward the uplink data packet to the mobility management network element.

704. The session management network element allocates the IP address to the terminal apparatus based on the second indication information.

The session management network element may determine, based on the second indication information, that the uplink data packet is used to request the IP address, and the session management network element may allocate the IP address to the terminal apparatus.

For example, the second indication information is used to indicate to select the data forwarding network element after the session is established and before the IP address is sent. The session management network element may allocate the IP address to the terminal apparatus after selecting the data forwarding network element.

For an example implementation of step 704, refer to step 502 in the embodiment shown in FIG. 5. Details are not described herein again.

705. The session management network element sends a downlink data packet to the mobility management network element, where the downlink data packet includes the IP address.

For example, the session management network element may invoke Namf_Communication_N1N2 Message Transfer to send the downlink data packet to the mobility management network element.

When the uplink data packet is the RS packet, the downlink data packet may be an RA packet; or when the uplink data packet is the DHCP discovery packet, the downlink data packet may be a DHCP offer packet. Alternatively, the downlink data packet may be another packet or another message used by the session management network element to send the IP address to the terminal apparatus.

706. The mobility management network element forwards the downlink data packet to the terminal apparatus.

The mobility management network element may encapsulate the downlink data packet in a downlink NAS message.

Optionally, step 707 may be further included in which the session management network element selects the data forwarding network element after the session establishment request is sent.

In other words, the session management network element may select the data forwarding network element after allocating the IP address to the terminal apparatus, or after sending the IP address to the terminal apparatus or the mobility management network element. As shown in FIG. 7, the session management network element may learn, based on the second indication information sent by the terminal apparatus, that content of the uplink data packet is used to request the IP address, and the uplink data packet may not be forwarded by the data forwarding network element, thereby reducing signaling interaction.

It should be understood that, in the embodiment shown in FIG. 7, the terminal apparatus sends the indication information to the session management network element, so that the session management network element allocates the IP address to the terminal apparatus. The indication information may be sent by another network element, for example, the mobility management network element.

Figure 8:
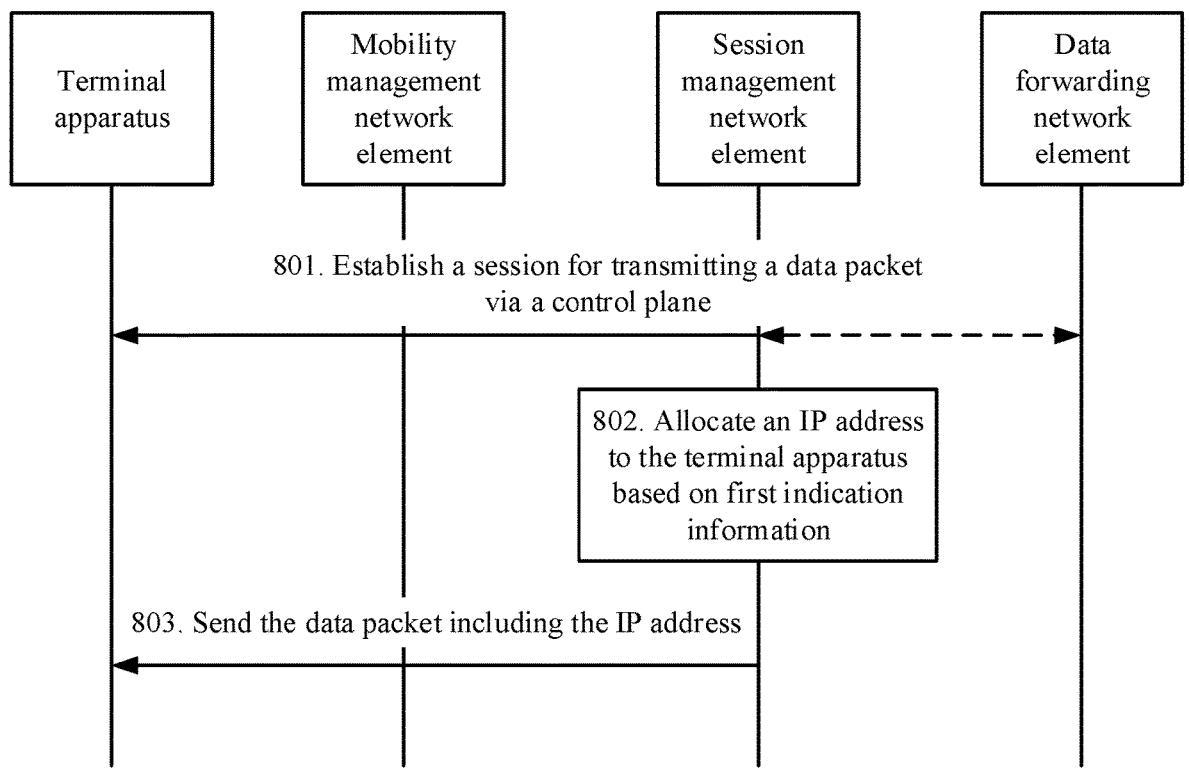
FIG. 8 is a schematic interaction diagram of a method for allocating and obtaining an IP address according to an embodiment of this application.

FIG. 8 is a schematic interaction diagram of a method for allocating and obtaining an IP address according to this application.

801. Establish a session for transmitting a data packet via a control plane network element.

For an example implementation of step 801, refer to step 501 in the embodiment shown in FIG. 5. Details are not described herein again.

A session management network element may receive a session establishment request message that is forwarded by a mobility management network element and that is from a terminal apparatus, and first indication information sent by the mobility management network element.

The first indication information may be control plane CIoT 5GS optimization indication information in a 5G communications system, or control plane CIoT EPS optimization indication information in an EPC network architecture.

Alternatively, the first indication information may indicate the session management network element to send the data packet to the mobility management network element.

Alternatively, the first indication information may indicate the session management network element not to send the data packet to a data forwarding network element.

Optionally, the first indication information may be used to indicate the session management network element not to select a data management network element in a session establishment procedure, or the first indication information may be used to indicate to select the data forwarding network element after the session is established and before an IP address is sent.

In the session establishment procedure, the session management network element may select the data forwarding network element, or may not select the data forwarding network element.

For example, the session management network element may not select the data forwarding network element in the session establishment procedure based on indication information sent by the terminal apparatus or the mobility management network element in the session establishment procedure.

802. The session management network element allocates the IP address to the terminal apparatus based on the first indication information.

The session management network element may actively allocate the IP address to the terminal apparatus based on the first indication information. In other words, when the session management network element does not receive an IP address request sent by the terminal apparatus, the session management network element may actively allocate the IP address to the terminal apparatus.

For example, the first indication information is control plane data transmission indication information, for example, the control plane CIoT 5GS optimization indication information in the 5G communications system, or the control plane CIoT EPS optimization indication information in the EPC network architecture. The session management network element may allocate, based on the first indication information, the IP address to the terminal apparatus after the session is established.

For example, the first indication information is used to indicate to select the data forwarding network element after the session is established and before the IP address is sent. The session management network element may allocate the IP address to the terminal apparatus, then select the data forwarding network element, and send the IP address. Alternatively, the session management network element may allocate the IP address to the terminal apparatus after selecting the data forwarding network element.

For an example implementation of step 802, refer to step 502 in the embodiment shown in FIG. 5. Details are not described herein again.

803. The session management network element sends a downlink data packet to the terminal apparatus via the mobility management network element, where the downlink data packet includes the IP address.

The mobility management network element may encapsulate the downlink data packet in a downlink NAS message.

For an example implementation of step 803, refer to step 503 in the embodiment shown in FIG. 5. Details are not described herein again.

Optionally, step 804 may be further included in which the session management network element selects the data forwarding network element after the session is established.

As shown in FIG. 8, the session management network element may not receive the IP address request sent by the terminal apparatus, or may allocate the IP address to the terminal apparatus before receiving the IP address request sent by the terminal apparatus. The terminal apparatus may obtain the IP address in advance, so that the IP address can be allocated to the terminal apparatus in a more flexible way.

Figure 9:
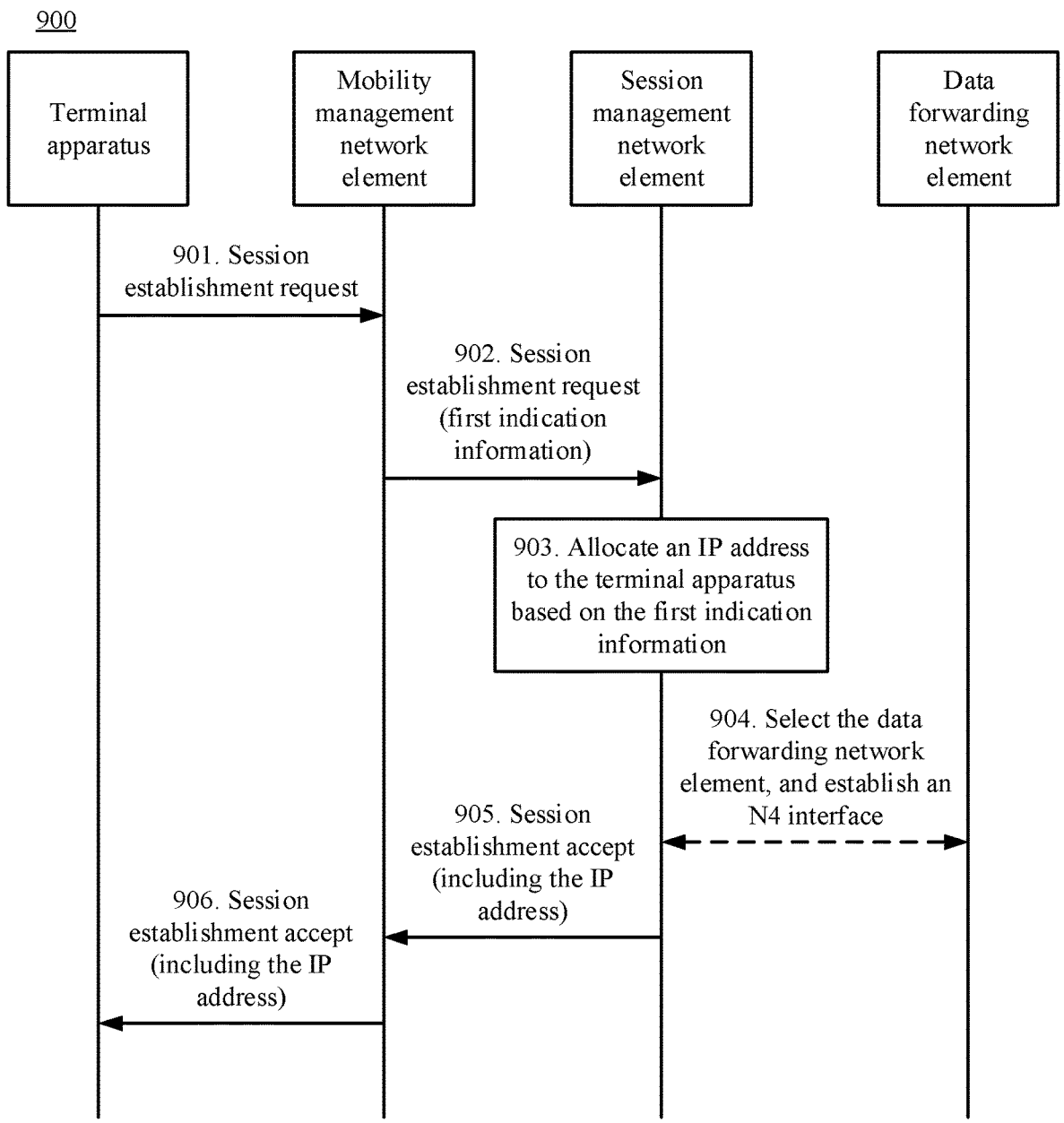
FIG. 9 is a schematic interaction diagram of a method for allocating and obtaining an IP address according to an embodiment of this application.

FIG. 9 is a schematic interaction diagram of a method for allocating and obtaining an IP address according to this application.

901. A terminal apparatus sends a session establishment request message to a mobility management network element.

The session establishment request message may be, for example, the session establishment request (for example, a PDU session establishment request) message in the session establishment procedure shown in FIG. 3, or may be the attach request message in the attach procedure shown in FIG. 4. The session establishment request message may carry a session identifier (for example, a PDU session ID)

and indication information indicating a session type. The session is a session for transmitting a data packet via a control plane network element.

902. The mobility management network element forwards the session establishment request message to a session management network element.

The mobility management network element may send first indication information to the session management network element during forwarding of the session establishment request message. In other words, the mobility management network element sends a request message to the session management network element, and the message includes the session establishment request message and the first indication information. The first indication information is used to indicate, to the session management network element, that the session is a session for transmitting the data packet via the control plane network element.

For example, the first indication information includes control plane data transmission indication information. The control plane data transmission indication information may be, for example, control plane CIoT 5GS optimization indication information in a 5G communications system, or may be control plane CIoT EPS optimization indication information in an EPC network architecture.

Alternatively, the first indication information may indicate the session management network element to send the data packet to the mobility management network element.

Alternatively, the first indication information may indicate the session management network element not to send the data packet to a data forwarding network element.

Optionally, the first indication information may be used to indicate to select the data forwarding network element after an IP address is allocated.

903. The session management network element allocates the IP address to the terminal apparatus based on the first indication information.

The session management network element may actively allocate the IP address to the terminal apparatus based on the first indication information. In other words, the session management network element allocates the IP address to the terminal apparatus in a session establishment procedure.

For example, the first indication information is the control plane data transmission indication information, for example, the control plane CIoT 5GS optimization indication information in the 5G communications system, or the control plane CIoT EPS optimization indication information in the EPC network architecture. The session management network element may allocate, based on the first indication information, the IP address to the terminal apparatus in the session establishment procedure.

For example, the first indication information is used to indicate to select the data forwarding network element after the IP address is allocated. The session management network element may allocate the IP address to the terminal apparatus, then select the data forwarding network element, and then send the IP address. Alternatively, the session management network element may select, based on the first indication information, the data forwarding network element after sending the IP address. That is, the session management network element may select the data forwarding network element after allocating the IP address to the terminal apparatus, or after sending the IP address to the terminal apparatus or the mobility management network element.

For an example implementation of step 903, refer to step 502 in the embodiment shown in FIG. 5. Details are not described herein again.

Optionally, the session establishment procedure may further include step 904 in which the session management network element selects the data forwarding network element.

In other words, in the session establishment procedure, the session management network element may select the data forwarding network element, or may not select the data forwarding network element.

The session management network element may not select the data forwarding network element in the session establishment procedure based on indication information sent by the terminal apparatus or the mobility management network element in the session establishment procedure.

For example, the first indication information is used to indicate to select the data forwarding network element after the IP address is allocated. The session management network element may first allocate the IP address to the terminal apparatus based on the first indication information, and then select the data forwarding network element in the session establishment procedure. Alternatively, the session management network element may not select the data forwarding network element in the session establishment procedure based on the first indication information.

905. The session management network element sends a session establishment accept message to the mobility management network element.

The session management network element may invoke Namf_Communication_N1N2 Message Transfer to send an N1 session management (SM) message to the mobility management network element, where the N1 SM message includes the session establishment accept message, and the session establishment accept message may include an RA packet or a DHCP offer packet. The session establishment accept message may be, for example, a PDU session establishment accept message.

906. The mobility management network element forwards the session establishment accept message to the terminal apparatus.

The mobility management network element encapsulates the session establishment accept message into a NAS message.

It should be understood that, in the embodiment shown in FIG. 9, the mobility management network element sends the indication information to the session management network element, so that the session management network element allocates the IP address to the terminal apparatus. The indication information may be sent by another device, for example, the terminal apparatus.

As shown in FIG. 9, the session management network element may allocate the IP address to the terminal apparatus in the session establishment procedure, so that the terminal apparatus obtains the IP address in a more flexible way.

Figure 10:
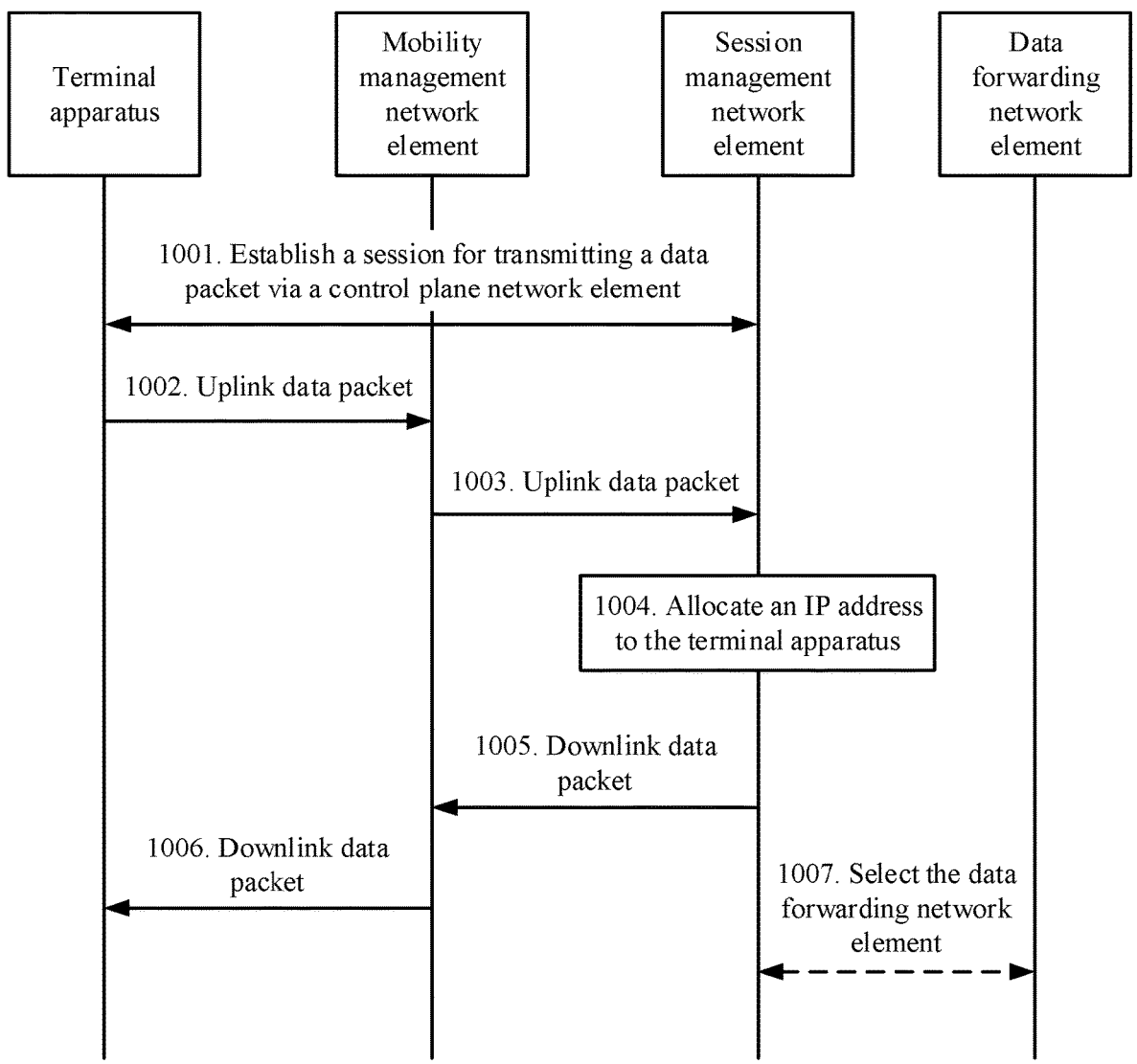
FIG. 10 is a schematic interaction diagram of a method for allocating and obtaining an IP address according to an embodiment of this application.

FIG. 10 is a schematic interaction diagram of a method for allocating and obtaining an IP address according to this application.

1001. Establish a session for transmitting a data packet via a control plane network element.

For an example implementation of step 1001, refer to step 501 in the embodiment shown in FIG. 5. Details are not described herein again.

In a session establishment procedure, a session management network element does not select a data forwarding network element.

For example, the session management network element does not select the data forwarding network element in the session establishment procedure based on indication information sent by a terminal apparatus or a mobility management network element in the session establishment procedure.

The session management network element may receive a session establishment request message that is forwarded by the mobility management network element and that is from the terminal apparatus, and first indication information sent by the mobility management network element.

The first indication information may be control plane CIoT 5GS optimization indication information in a 5G communications system, or control plane CIoT EPS optimization indication information in an EPC network architecture.

Alternatively, the first indication information may indicate the session management network element to send the data packet to the mobility management network element.

Alternatively, the first indication information may indicate the session management network element not to send the data packet to the data forwarding network element.

Optionally, the first indication information may be used to indicate the session management network element not to select a data management network element in the session establishment procedure, or the first indication information may be used to indicate to select the data forwarding network element after the session is established and before an IP address is sent.

1002. The terminal apparatus sends an uplink data packet to the mobility management network element to request the IP address.

The uplink data packet may be encapsulated in an uplink non-access stratum (NAS) message.

The uplink data packet may be, for example, an RS packet or a DHCP discovery packet, or another packet or another message used by the terminal apparatus to request a core network to allocate the IP address.

The uplink data packet may carry a session identifier (ID).

1003. The mobility management network element forwards the uplink data packet to the session management network element.

The mobility management network element may decapsulate the uplink NAS message to obtain the uplink data packet.

For example, the mobility management network element may invoke Nsmf_PDUSession_Message Transfer to forward the uplink data packet to the mobility management network element.

1004. The session management network element allocates the IP address to the terminal apparatus.

For an example implementation of step 1004, refer to step 502 in the embodiment shown in FIG. 5. Details are not described herein again.

1005. The session management network element sends a downlink data packet to the mobility management network element, where the downlink data packet includes the IP address.

For example, the session management network element may invoke Namf_Communication_N1N2 Message Transfer to send the downlink data packet to the mobility management network element.

When the uplink data packet is the RS packet, the downlink data packet may be an RA packet; or when the uplink data packet is the DHCP discovery packet, the downlink data packet may be a DHCP offer packet. Alternatively, the downlink data packet may be another packet or another message used by the session management network element to send the IP address to the terminal apparatus.

1006. The mobility management network element forwards the downlink data packet to the terminal apparatus.

The mobility management network element may encapsulate the downlink data packet in a downlink NAS message.

1007. The session management network element selects the data forwarding network element based on the first indication information.

In other words, the session management network element may select, based on the first indication information, the data forwarding network element after allocating the IP address to the terminal apparatus, or after sending the IP address to the terminal apparatus or the mobility management network element.

As shown in FIG. 10, because a connection between the session management network element and the data forwarding network element is not established in the session establishment procedure, a packet check function needs to be enabled for the session management network element, to obtain an IP address request in the uplink data packet.

It should be understood that, in the embodiment shown in FIG. 10, the mobility management network element sends the indication information to the session management network element, so that the session management network element allocates the IP address to the terminal apparatus. The indication information may be sent by another device, for example, the terminal apparatus.

The method according to this embodiment of this application may be used in a plurality of network architectures, for example, the network architectures shown in FIG. 3 and FIG. 4. It should be understood that, in this application, descriptions of the network elements in the embodiments shown in FIG. 5 to FIG. 10 are function descriptions. Based on functions of the network elements, a person of ordinary skill in the art may apply the embodiments shown in FIG. 5 to FIG. 10 to the network architectures shown in FIG. 3 and FIG. 4 and another similar network architecture. To make a person of ordinary skill in the art more clearly understand that the solutions of this application can be used in various communication scenarios for the functions of the network elements, in this application, FIG. 11 is used to show that the solution corresponding to FIG. 5 is used in the network architecture shown in FIG. 4.

Figure 11:
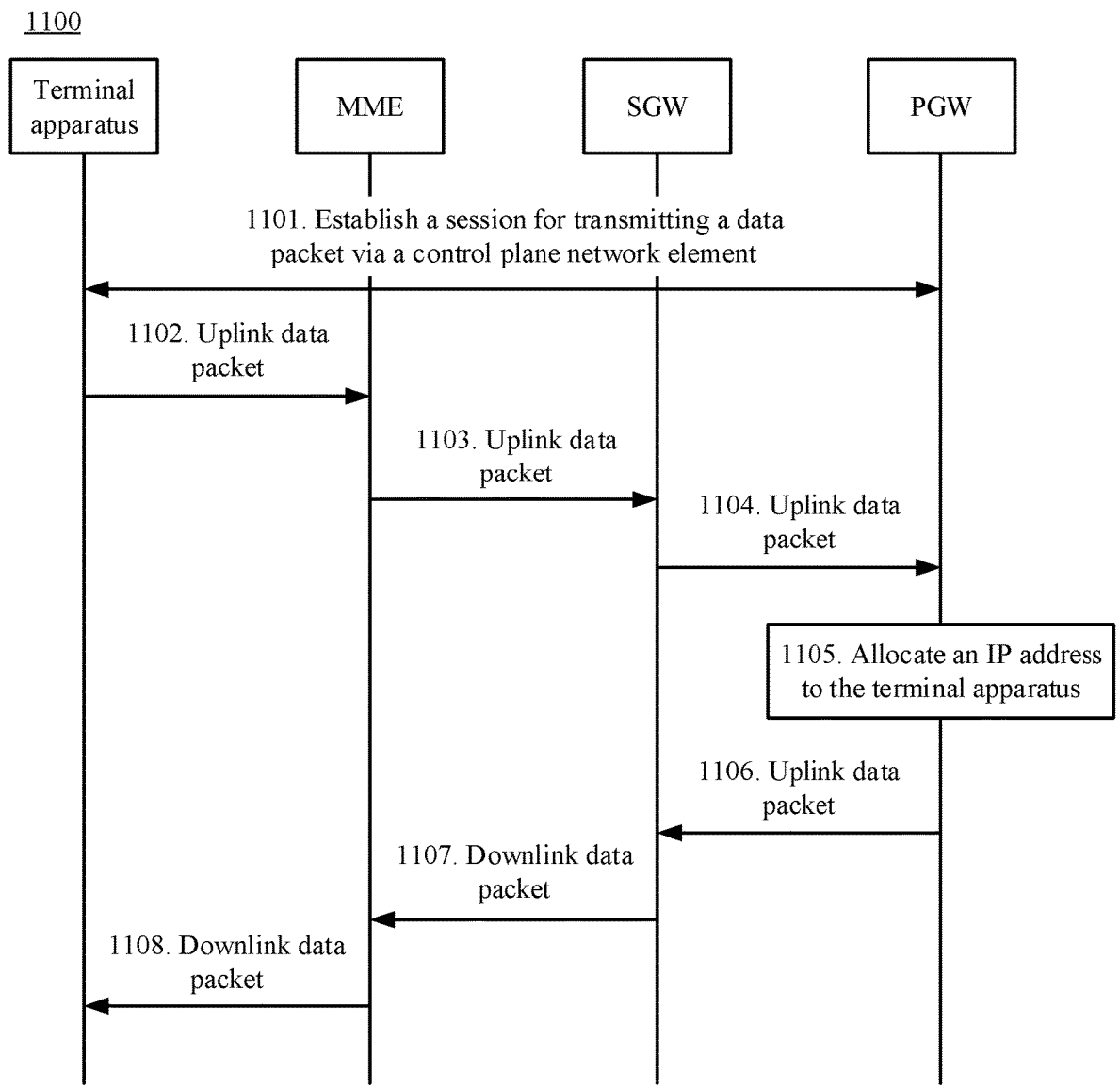
FIG. 11 is a schematic interaction diagram of a method for allocating and obtaining an IP address according to an embodiment of this application.

FIG. 11 shows a method for allocating and obtaining an IP address according to an embodiment of this application.

1101. Establish a session for transmitting a data packet via a control plane network element.

For example, a terminal apparatus sends a PDN connection establishment request, to request to establish a PDN connection that supports in transmitting the data packet (control plane CIoT EPS optimization) via the control plane network element. The PDN connection establishment request may carry indication information (for example, protocol configuration options) to indicate a session type and indicate to obtain an IP address after the PDN connection is established. In a PDN connection establishment procedure, an MME may allocate an evolved packet system bearer identity (EBI) and establish an S11-U interface.

For an example implementation of step 1101, refer to steps 401 to 411 in the embodiment shown in FIG. 4. Details are not described herein again.

1102. The terminal apparatus sends an uplink data packet to the MME to request the IP address.

The uplink data packet may be, for example, an RS packet or a DHCP discovery data packet, or another packet or another message used by the terminal apparatus to request a core network to allocate the IP address.

The uplink data packet may carry the EBI.

For example, the terminal apparatus may encapsulate the uplink data packet in an uplink NAS message, and send the uplink NAS message to the MME.

1103. The MME sends the uplink data packet to an SGW.

For example, the MME may send the uplink data packet to the SGW through the S11-U interface.

1104. The SGW forwards the uplink data packet to a PGW.

1105. The PGW responds to the uplink data packet, and allocates the IP address to the terminal apparatus.

For example, the PGW may receive the uplink data packet that is sent by the MME and that is from the terminal apparatus, where the uplink data packet includes the RS packet or the DHCP discovery packet; and the PGW may allocate the IP address to the terminal apparatus based on the uplink data packet. That is, the PGW may allocate the IP address to the terminal apparatus after receiving the RS packet or the DHCP discovery packet.

In an example, the operation of allocating the IP address to the terminal apparatus may alternatively be an operation of constructing a downlink data packet, where the downlink data packet includes the IP address.

For example, when the uplink data packet is the RS packet, the downlink data packet may be an RA packet; or when the uplink data packet is the DHCP discovery packet, the downlink data packet may be a DHCP offer packet. Alternatively, the downlink data packet may be another packet or another message used by the PGW to send the IP address to the terminal apparatus.

For an example implementation of step 1105, refer to step 502 in the embodiment shown in FIG. 5. Details are not described herein again.

1106. The PGW sends the downlink data packet to the SGW.

1107. The SGW forwards the downlink data packet to the MME.

For example, the SGW may send the downlink data packet to the MME through the S11-U interface.

1108. The MME sends the downlink data packet to the terminal device.

For example, the MME encapsulates the downlink data packet in a downlink NAS message, and sends the downlink NAS message to the terminal apparatus.

The foregoing describes in detail the methods for allocating and obtaining an IP address according to the embodiments of this application with reference to FIG. 5 to FIG. 11. The following describes in detail an apparatus and a device for allocating and obtaining an IP address according to the embodiments of this application with reference to FIG. 12 to FIG. 16.

Figure 12:
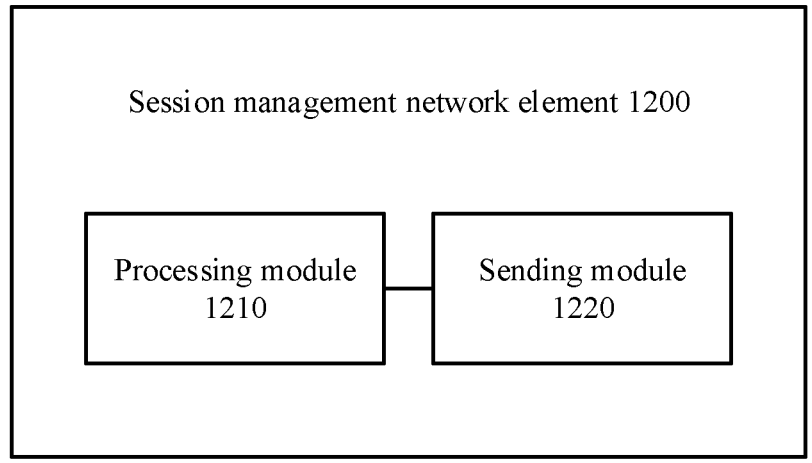
FIG. 12 is a schematic block diagram of a session management network element according to an embodiment of this application.

FIG. 12 is a schematic block diagram of a session management network element 1200 according to an embodiment of this application. As shown in FIG. 12, the session management network element 1200 includes:

a processing module 1210, configured to establish a session for a terminal apparatus, where the session is used for transmitting a data packet via a control plane network element, where the processing module 1210 is further configured to allocate an IP address to the terminal apparatus; and a sending module 1220, configured to send a downlink data packet to the terminal apparatus via a mobility management network element, where the downlink data packet includes the IP address.

Therefore, the session management network element according to this embodiment of this application allocates and sends the IP address to the terminal apparatus without establishing an additional connection channel, so that the terminal apparatus can obtain the IP address more flexibly, and occupation of excessive signaling resources can be avoided.

In an embodiment, the session management network element 1200 may be the session management network element in the foregoing method embodiment, or may be a chip configured to implement a function of the session management network element in the foregoing method embodiment. The session management network element 1200 may correspond to the session management network element in the method 500, 600, 700, 800, 900, 1000, or 1100 according to the embodiments of this application, and the session management network element 1200 may include units configured to perform the methods performed by the session management network elements in the method 500 to the method 1100 in FIG. 5 to FIG. 11. In addition, the foregoing and other operations and/or functions of the units in the session management network element 1200 are separately used to implement corresponding procedures of the method 500 to the method 1100 in FIG. 5 to FIG. 11. It should be understood that a process in which each unit performs the foregoing corresponding steps is described in detail in the foregoing method embodiments. For brevity, details are not described herein again.

Figure 13:
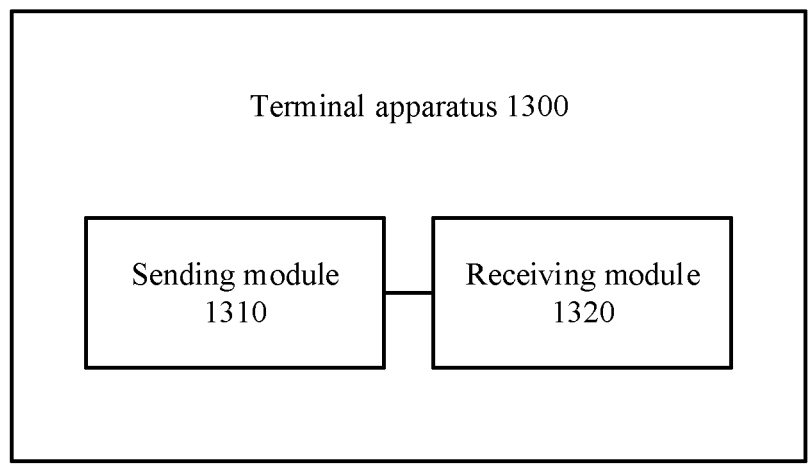
FIG. 13 is a schematic block diagram of a terminal apparatus according to an embodiment of this application.

FIG. 13 is a schematic block diagram of a terminal apparatus 1300 according to an embodiment of this application. As shown in FIG. 13, the terminal apparatus 1300 includes:

a sending module 1310, configured to send a session establishment request message to a mobility management network element, to establish a session that is between the terminal apparatus and a session management network element and that is used for transmitting a data packet via a control plane network element, where the sending module 1310 is further configured to send an uplink data packet to the mobility management network element, where the uplink data packet includes target indication information, and the target indication information is used to indicate the session management network element to allocate an IP address; and a receiving module 1320, configured to receive, via the mobility management network element, a downlink data packet sent by the session management network element, where the downlink data packet includes the IP address.

In an embodiment, the terminal apparatus 1300 may be the terminal apparatus in the foregoing method embodiment, or may be a chip configured to implement a function of the terminal apparatus in the foregoing method embodiment. The terminal apparatus 1300 may correspond to the terminal apparatus in the method 500, 600, 700, 800, 900, 1000, or 1100 according to the embodiments of this application, and the terminal apparatus 1300 may include units configured to perform the methods performed by the terminal apparatuses in the method 500 to the method 1100 in FIG. 5 to FIG. 11. In addition, the foregoing and other operations and/or functions of the units in the terminal apparatus 1300 are separately used to implement corresponding procedures of the method 500 to the method 1100 in FIG. 5 to FIG. 11. It should be understood that a process in which each unit performs the foregoing corresponding steps is described in detail in the foregoing method embodiments. For brevity, details are not described herein again.

Therefore, the terminal apparatus according to this embodiment of this application obtains the IP address without establishing an additional connection channel, so that the terminal apparatus can obtain the IP address more flexibly, and occupation of excessive signaling resources can be avoided.

Figure 14:
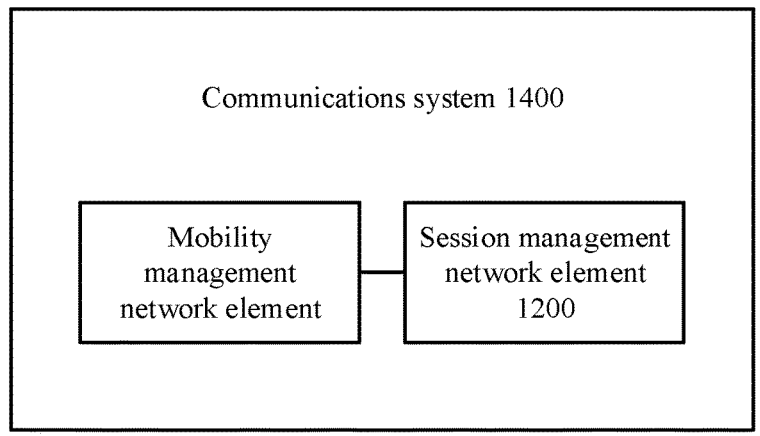
FIG. 14 is a schematic block diagram of a communications system according to an embodiment of this application.

An embodiment of this application further provides a communications system 1400. As shown in FIG. 14, the communications system 1400 includes:

the session management network element 1200 in the foregoing embodiment of this application.

Further, the communications system 1400 may further include the terminal apparatus 1300 in the foregoing embodiment of this application.

Further, the communications system 1400 may further include a data forwarding network element.

Figure 15:
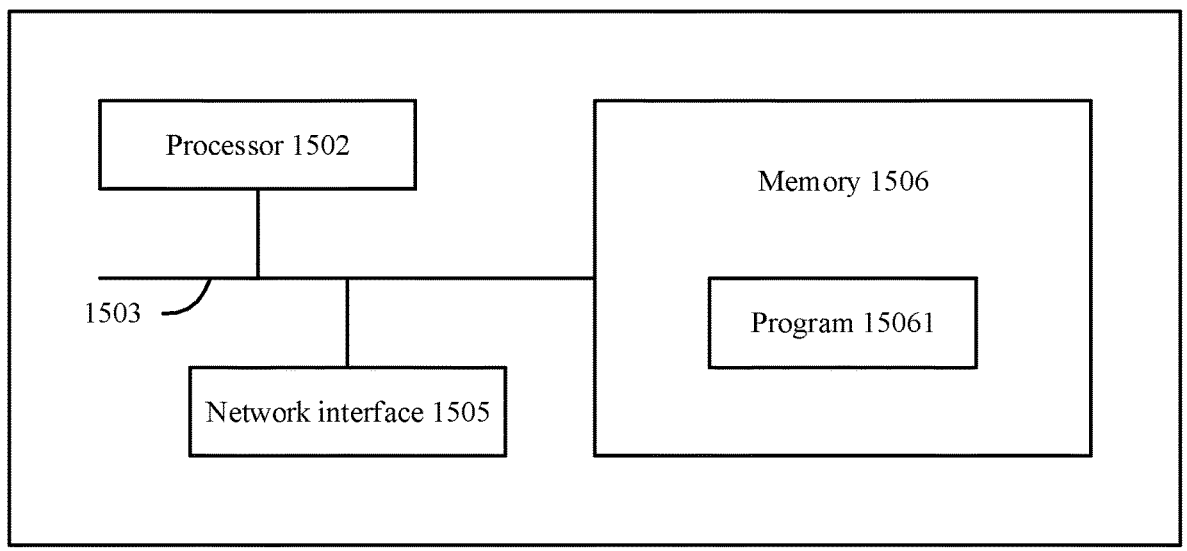
FIG. 15 is a schematic structural diagram of a session management network element according to an embodiment of this application.

FIG. 15 shows a structure of a session management network element according to still another embodiment of this application. The session management network element includes at least one processor 1502 (for example, a general-purpose processor CPU having computing and processing capabilities, a digital signal processor (DSP), an application-specific integrated circuit (ASIC), or a field programmable gate array (FPGA)). The session management network element further includes at least one network interface 1505 or another communications interface, a memory 1506, and at least one bus system 1503. The components in the session management network element are coupled by using the bus system 1503. The bus system 1503 may include a data bus, a power bus, a control bus, a status signal bus, and the like. For clarity of description, various buses are marked as the bus system 1503 in the figure.

The method disclosed in the embodiments of this application may be used by the processor 1502, or is used to execute an executable module stored in the memory 1506, for example, a computer program. The memory 1506 may include a high-speed random access memory (RAM), or may further include a non-volatile memory. The memory may include a read-only memory and a random access memory, and provide required signaling or data, a required program, and the like for the processor. A part of the memory may further include a non-volatile random access memory (NVRAM). The at least one network interface 1505 (which may be wired or wireless) is used to implement a communication connection to at least one another network element.

In some implementations, the memory 1506 stores a program 15061, and the processor 1502 executes the program 15061 to perform the following operations:

establishing a session for a terminal apparatus, where the session is used for transmitting a data packet via a control plane network element;

allocating an IP address to the terminal apparatus; and sending a downlink data packet to the terminal apparatus via a mobility management network element, where the downlink data packet includes the IP address.

It should be noted that the session management network element may be the session management network element in the foregoing embodiments, and may be configured to perform steps and/or procedures corresponding to the session management network element in the foregoing method embodiments.

Therefore, the session management network element according to this embodiment of this application allocates and sends the IP address to the terminal apparatus without establishing an additional connection channel, so that the terminal apparatus can obtain the IP address more flexibly, and occupation of excessive signaling resources can be avoided.

The session management network element 1500 in this embodiment of this application may correspond to the session management network element in the communication method in the embodiments of this application, and the foregoing and other operations and/or functions of the modules in the session management network element 1500 are separately used to implement corresponding procedures of the foregoing methods. For brevity, details are not described herein again.

Figure 16:
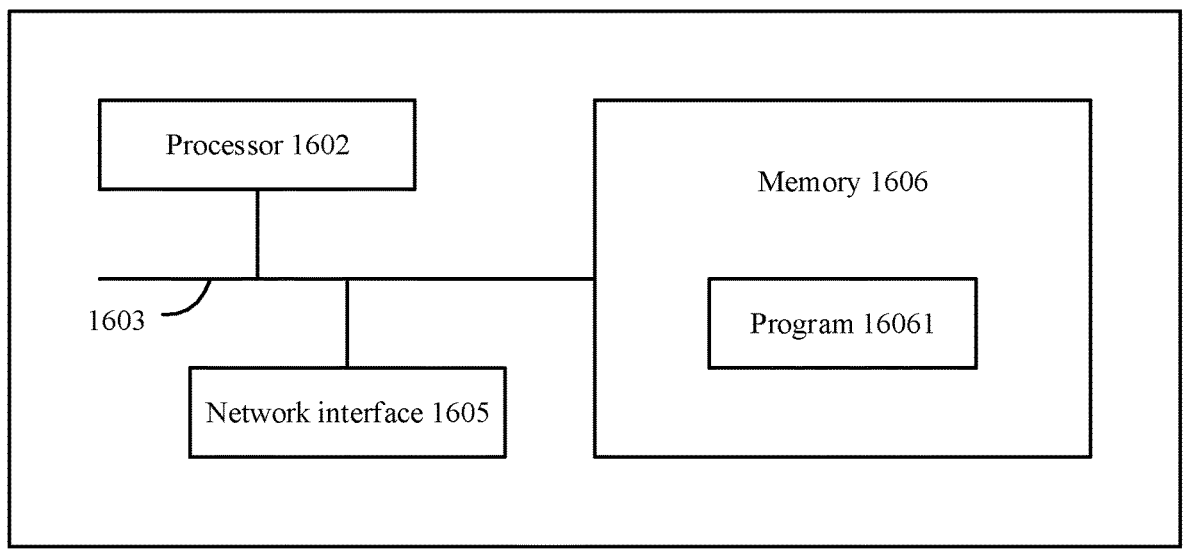
FIG. 16 is a schematic structural diagram of a terminal apparatus according to an embodiment of this application.

FIG. 16 shows a structure of a terminal apparatus according to still another embodiment of this application. The terminal apparatus includes at least one processor 1602 (for example, a general-purpose processor CPU having computing and processing capabilities, a digital signal processor (DSP), an application-specific integrated circuit (ASIC), or a field programmable gate array (FPGA)). The processor manages and schedules modules and components in the terminal apparatus. The terminal apparatus further includes at least one network interface 1605 or another communications interface, a memory 1606, and at least one bus system 1603. The components in the terminal apparatus are coupled by using the bus system 1603. The bus system 1603 may include a data bus, a power bus, a control bus, a status signal bus, and the like. For clarity of description, various buses are marked as the bus system 1603 in the figure.

The method disclosed in the embodiments of this application may be used by the processor 1602, or is used to execute an executable module stored in the memory 1606, for example, a computer program. The memory 1606 may include a high-speed random access memory (RAM), or may further include a non-volatile memory. The memory may include a read-only memory and a random access memory, and provide required signaling or data, a required program, and the like for the processor. A part of the memory may further include a non-volatile random access memory (NVRAM). The at least one network interface 1605 (which may be wired or wireless) is used to implement a communication connection to at least one another network element.

In some implementations, the memory 1606 stores a program 16061, and the processor 1602 executes the program 16061 to perform the following operations:

sending a session establishment request message to a mobility management network element, to establish a session that is between the terminal apparatus and a session management network element and that is used for transmitting a data packet via a control plane network element;

sending an uplink data packet to the mobility management network element, where the uplink data packet includes target indication information, and the target indication information is used to indicate the session management network element to allocate an IP address; and receiving, via the mobility management network element, a downlink data packet sent by the session management network element, where the downlink data packet includes the IP address.

It should be noted that the terminal apparatus may be the terminal apparatus in the foregoing embodiments, and may be configured to perform steps and/or procedures corresponding to the terminal apparatus in the foregoing method embodiments.

Therefore, the terminal apparatus according to this embodiment of this application obtains the IP address without establishing an additional connection channel, so that the terminal apparatus can obtain the IP address more flexibly, and occupation of excessive signaling resources can be avoided.

The terminal apparatus 1600 in this embodiment of this application may correspond to the terminal apparatus in the communication method in the embodiments of this application, and the foregoing and other operations and/or functions of the modules in the terminal apparatus 1600 are separately used to implement corresponding procedures of the foregoing methods. For brevity, details are not described herein again.

An embodiment of this application further provides a computer storage medium, and the computer storage medium may store a program instruction for executing any of the foregoing methods.

Optionally, the storage medium may be either of the memory 1506 and the memory 1606.

It should be understood that the term "and/or" in this specification describes only an association relationship between associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that sequence numbers of the foregoing processes do not mean execution sequences in the embodiments of this application. The execution sequences of the processes should be determined based on functions and internal logic of the processes, and should not be construed as any limitation on the implementation processes of the embodiments of this application.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on a particular application and a design constraint condition of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the described system, apparatus, and unit, refer to a corresponding process in the foregoing method embodiments. Details are not described herein again.

In the several embodiments provided in this application, it should be understood that the disclosed system, apparatus, and method may be implemented in another manner. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on an actual requirement to achieve the objectives of the solutions of the embodiments.

In addition, functional units in the embodiments of this application may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method for allocating an internet protocol (IP) address, comprising:
    receiving, by a session management function (SMF), a request message from an access and mobility management function (AMF), the request message comprising first indication information and a session establishment request message, wherein the first indication information indicating transmitting a data packet between a wireless terminal apparatus and a user plane function (UPF) via a control plane, the control plane comprising the AMF and the SMF;
    establishing, by the SMF, a session for the wireless terminal apparatus with the UPF, the session is for transmitting the data packet;
    allocating, by the SMF, an IP address to the wireless terminal apparatus; and
    transmitting, by the SMF, based on the first indication information, the data packet over the control plane to the wireless terminal apparatus via the AMF, the data packet comprising the IP address.

2. The method according to claim 1, wherein the method further comprises:
    selecting, by the SMF based on the first indication information, a data forwarding network element after the session is established and before the SMF sends the data packet to the wireless terminal apparatus via the AMF.

3. The method according to claim 1, wherein before the allocating, by the SMF, the IP address to the wireless terminal apparatus, the method further comprises:
    receiving, by the SMF, second indication information sent by the AMF and that is from the wireless terminal apparatus, wherein the second indication information indicates the SMF allocate the IP address to the wireless terminal apparatus.

4. The method according to claim 1, wherein the method further comprises:
receiving, by the SMF, an uplink data packet sent by the AMF and that is from the wireless terminal apparatus, wherein the uplink data packet comprises a router solicitation (RS) packet or a dynamic host configuration protocol (DHCP) discovery packet; and
allocating, by the SMF, the IP address to the wireless terminal apparatus based on the uplink data packet.

5. The method according to claim 1, wherein the data packet comprises a router advertisement (RA) packet or a dynamic host configuration protocol (DHCP) offer packet.

6. The method according to claim 1, wherein a session type is one of an internet protocol version 6 (IPv6), a hybrid internet protocol version 4 and version 6 (IPv4v6), or an internet protocol version 4 (IPv4).

7. A method for obtaining an internet protocol (IP) address, comprising:
generating, by a wireless terminal apparatus, a session establishment request message, the session establishment request message requests establishing a session between the wireless terminal apparatus and a user plane function (UPF);
sending, by the wireless terminal apparatus, the session establishment request message to an access and mobility management function (AMF);
receiving, by a session management function (SMF), a request message from the AMF, the request message comprising first indication information and the session establishment request message, the first indication information indicating transmitting a data packet between a wireless terminal apparatus and the UPF via a control plane, the control plane comprising the AMF and the SMF;
establishing, by the SMF, a session for the wireless terminal apparatus with the UPF, wherein the session is for transmitting the data packet between the wireless terminal apparatus and the UPF via the control plane;
receiving, by the wireless terminal apparatus, a session establishment accept message from the AMF in response to the session establishment request message;
allocating, by the SMF, an IP address to the wireless terminal apparatus; and
receiving, by the wireless terminal apparatus, a data packet over the control plane via the AMF and the SMF, the data packet comprising the IP address.

8. The method according to claim 7, wherein the data packet comprises a router advertisement (RA) packet or a dynamic host configuration protocol (DHCP) offer packet.

9. The method according to claim 7, wherein a session type is one of an internet protocol version 6 (IPv6), a hybrid internet protocol version 4 and version 6 (IPv4v6), or an internet protocol version 4 (IPv4).

10. A system, comprising:
a wireless terminal apparatus, the wireless terminal apparatus configured to:
generate a session establishment request message, the session establishment request message requests establishing a session between the wireless terminal apparatus and a user plane function (UPF);
send the session establishment request message to an access and mobility management function (AMF);
receive a session establishment accept message from the AMF in response to the session establishment request message; and
receive the data packet over the control plane via the AMF and the SMF, the data packet comprising the IP address;
the session management function (SMF) in communication with the wireless terminal apparatus, the SMF configured to:
receive the request message from the AMF, the request message comprising first indication information and the session establishment request message, the request message indicating transmitting a data packet between a wireless terminal apparatus and a user plane function (UPF) via a control plane, the control plane comprising the AMF and the SMF;
establish a session for the wireless terminal apparatus with the UPF, wherein the session is for transmitting the data packet between the wireless terminal apparatus and the UPF via the control plane; and
allocate an IP address to the wireless terminal apparatus.

11. The wireless terminal apparatus according to claim 10, wherein the data packet comprises a router advertisement (RA) packet or a dynamic host configuration protocol (DHCP) offer packet.

12. The wireless terminal apparatus according to claim 10, wherein a session type is one of an internet protocol version 6 (IPv6), a hybrid internet protocol version 4 and version 6 (IPv4v6), or an internet protocol version 4 (IPv4).

* * * * *